(12) United States Patent
Ikeuchi

(10) Patent No.: US 10,084,934 B2
(45) Date of Patent: Sep. 25, 2018

(54) INFORMATION PROCESSING APPARATUS THAT GENERATES FILE NAMES FOR NAMING FILES, METHOD OF CONTROLLING THE SAME, AND STORAGE MEDIUM

(71) Applicant: CANON KABUSHIKI KAISHA, Tokyo (JP)

(72) Inventor: Yuma Ikeuchi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 22 days.

(21) Appl. No.: 14/925,134

(22) Filed: Oct. 28, 2015

(65) Prior Publication Data
US 2016/0127579 A1    May 5, 2016

(30) Foreign Application Priority Data
Nov. 5, 2014 (JP) .................................. 2014-225440

(51) Int. Cl.
*H04N 1/21*  (2006.01)
*H04N 1/00*  (2006.01)

(52) U.S. Cl.
CPC ....... *H04N 1/2175* (2013.01); *H04N 1/00244* (2013.01); *H04N 1/00411* (2013.01); *H04N 2201/0094* (2013.01)

(58) Field of Classification Search
CPC ............ H04L 29/12603; H04L 29/1265; H04L 29/12179; H04L 61/1582; H04N 1/2175; H04N 1/2166
See application file for complete search history.

(56) References Cited

U.S. PATENT DOCUMENTS

| | | | | |
|---|---|---|---|---|
| 7,154,538 B1* | 12/2006 | Fukasawa | ............... | H04M 11/04 348/211.3 |
| 2005/0105722 A1* | 5/2005 | Hashimoto | ............... | H04K 1/00 380/51 |
| 2005/0273858 A1* | 12/2005 | Zadok | ..................... | G06F 21/50 726/24 |
| 2010/0033746 A1* | 2/2010 | Liu | ..................... | H04N 1/00344 358/1.13 |
| 2014/0293361 A1* | 10/2014 | Mori | .................. | H04N 1/32379 358/403 |

FOREIGN PATENT DOCUMENTS

JP    2002064534 A    2/2002

* cited by examiner

*Primary Examiner* — Nicholas Pachol
(74) *Attorney, Agent, or Firm* — Rossi, Kimms & McDowell LLP

(57) ABSTRACT

An image file naming rule is set by setting each of a plurality of items that configure a file name. It is determined whether or not any one of the plurality of items includes an item for which information that defines the file name to be unique is set. If it is determined that none of the plurality of items includes the item for which information that defines the file name to be unique is set upon changing information set in a target item of the plurality of items, information that can be set for the target item is restricted.

7 Claims, 20 Drawing Sheets

FIG. 5
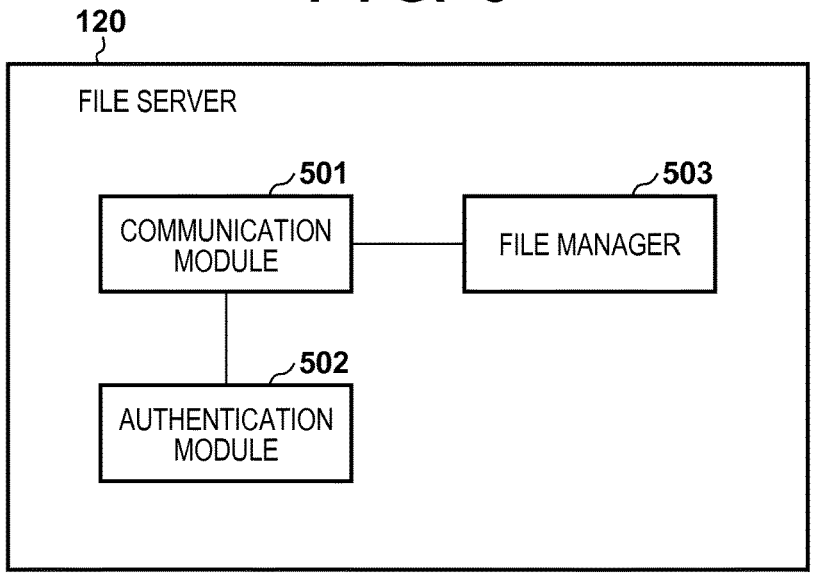
FIG. 6
| | 601 | 602 | 603 | 607 |
|---|---|---|---|---|
| | DESTINATION ID | REGISTRATION NAME | TELEPHONE NUMBER | ADDRESS BOOK NAME |
| 604 | 00100 | ABC TRADING | 0334344545 | MR A |
| 605 | 00101 | Zmarketing | 0343295054 | MS B |
| 606 | 00102 | K BUSSAN | 0385498854 | MRS C |
| | ... | ... | ... | |
FIG. 7
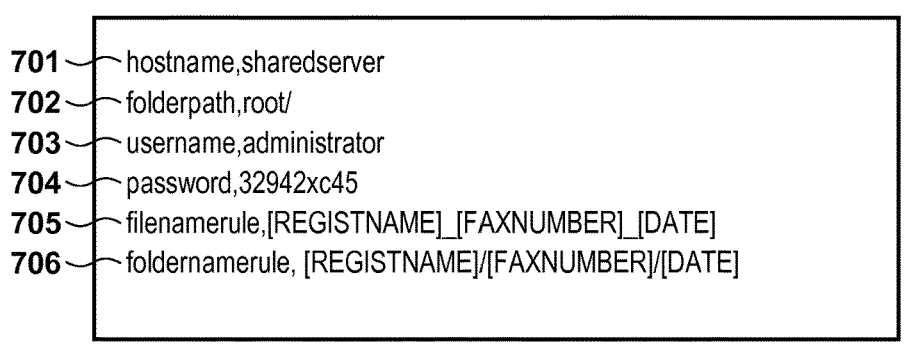

FIG. 10A

FILE NAMING RULE SETTING 1001     1002     1003

[RECEPTION DATE AND TIME] ▽   [FAX NUMBER] ▽   [REGISTRATION NAME] ▽

1004

• TYPE OF SEPARATOR   UNDERSCORE ▽

1005

EXAMPLE: 20140731113059_111111xxxx_Company A 1006     1007     1008

CANCEL     RETURN     NEXT

FIG. 10B

FILE NAMING RULE SETTING 1001     1002     1003

[RECEPTION DATE AND TIME] ▽   [FAX NUMBER] ▽   [REGISTRATION NAME] ▽

[RECEPTION DATE AND TIME]
[SERIAL NUMBER]   1011
[RANDOM NUMBER]

1009           1004

• TYPE OF SEPARATOR   UNDERSCORE ▽

1005

EXAMPLE: 20140731113059_111111xxxx_Company A 1006     1007     1008

CANCEL     RETURN     NEXT

THE SELECTED ITEM IS RESTRICTED IN ORDER TO GENERATE A UNIQUE FILE NAME.

FILE NAMING RULE SETTING 1001  1002  1003

[NONE] ▽   [NONE] ▽   [NONE] ▽
[RECEPTION DATE AND TIME]
[SERIAL NUMBER]            1011
[RANDOM NUMBER]
                                                 1004
1012                  • TYPE OF SEPARATOR   UNDERSCORE ▽

EXAMPLE:

1006    1007    1008
CANCEL   RETURN   NEXT

THE SELECTED ITEM IS RESTRICTED IN ORDER TO GENERATE A UNIQUE FILE NAME.
1010

FIG. 19A

FILE NAMING RULE SETTING

1001 [RECEPTION DATE AND TIME] ▽  1002 [FAX NUMBER] ▽  1003 [REGISTRATION NAME] ▽

[RECEPTION DATE AND TIME]
[NONE]
[REGISTRATION NAME]  ~1901
[FAX NUMBER]
[ADDRESS BOOK NAME]
[LINE NUMBER]
[SERIAL NUMBER]
[RANDOM NUMBER]

• TYPE OF SEPARATOR  1004 UNDERSCORE ▽

1005 EXAMPLE: 20140731113059_111111xxxx_Company A

1006 CANCEL   1007 RETURN   1008 NEXT

FIG. 19B

FILE NAMING RULE SETTING

1001 [ADDRESS BOOK NAME] ▽  1002 [RECEPTION DATE AND TIME] ▽  1003 [REGISTRATION NAME] ▽

• TYPE OF SEPARATOR  1004 UNDERSCORE ▽

1005 EXAMPLE: abcdef_20140731113059_CompanyA

1006 CANCEL   1007 RETURN   1008 NEXT

SELECTION ITEM 2 WAS CHANGED IN ORDER TO GENERATE A UNIQUE FILE NAME.

FILE NAMING RULE SETTING

1001 [RECEPTION DATE AND TIME] ▽
1002 [FAX NUMBER] ▽
1003 [REGISTRATION NAME] ▽

• TYPE OF SEPARATOR 1004 UNDERSCORE ▽

1005
EXAMPLE: 20140731113059_111111xxxx_Company A

1006 CANCEL
1007 RETURN
1008 NEXT

SELECTION ITEM 1 CANNOT BE CHANGE IN ORDER TO GENERATE A UNIQUE FILE NAME

2101

F I G. 23

| FILE NAMING RULE SETTING | | |
|---|---|---|
| 1001 | 1002 | 1003 |
| [ADDRESS BOOK NAME] ▽ | [FAX NUMBER] ▽ | [REGISTRATION NAME] ▽ |

VALUE FOR SELECTION ITEM 2 WILL BE CHANGED FROM "FAX NUMBER" TO "RECEPTION DATE AND TIME". IS THIS OK?

2301

2302 YES    2303 NO

EXAMPLE: 20140731113059_111111xxxx_Company A

| 1006 CANCEL | 1007 RETURN | 1008 NEXT |

INFORMATION PROCESSING APPARATUS THAT GENERATES FILE NAMES FOR NAMING FILES, METHOD OF CONTROLLING THE SAME, AND STORAGE MEDIUM

BACKGROUND OF THE INVENTION

Field of the Invention

The present invention relates to an information processing apparatus, a method of controlling the same, and a storage medium.

Description of the Related Art

In a service using a fax, digitization of a fax document received by an MFP or by fax is performed by using a scan function of the MFP or a document scanner, and the result is stored on a file server, or the like. Here MFP is an abbreviation of Multi Function Peripheral, and is an example of an image forming apparatus that has a plurality of functions, such as a copying machine, a scanner, and a facsimile. In this case, to allow optimization of work to digitize and store to a file server, a system for transferring of received faxes that digitizes a fax document, and automatically stores the result in a file server in accordance with an attribute of the fax document is constructed. In such a system, a file name is generated in accordance with a telephone number of a transmission source or other attribute information of the received fax document, and storage to the file server is performed. Here, if a file name of a new fax document is the same as a file name of an existing fax document that was stored, the new fax document will overwrite the existing fax document, and so there is the possibility that the existing fax document will disappear.

As a strategy for handling a disappearance of such a stored fax document, for example according to Japanese Patent Laid-Open No. 2002-64534, there is a technique of adding a unique identification number as a file name to a fax document received by a FAX server and then storing the fax document. Using the technique recited in this document, because an identification number unique to a communication network or an identification number unique inside the FAX server is used as the file name of the fax document, a unique file name can be generated, and data loss due to duplication of file names can be prevented.

However, with the technique recited in the above described document, because a system side forcibly adds a unique identification number as the file name, visibility for a user is degraded. Therefore, when a user uses the stored fax document, there is a problem that specifying a desired fax document is difficult and it is cumbersome to search for a desired document.

SUMMARY OF THE INVENTION

An aspect of the present invention is to eliminate the above-mentioned problems with conventional technology.

A feature of the present invention is to provide a technique by which it is possible to set so that a file name of an image file becomes unique, and so that a visibility for a user is enhanced.

According to a first aspect of the present invention, there is provided an information processing apparatus, comprising: a setting unit configured to set an image file naming rule by setting each of a plurality of items that configure a file name; a determination unit configured to determine whether or not any one of the plurality of items includes an item for which information that defines the file name to be unique is set; and a restriction unit configured to restrict information that can be set for a target item of the plurality of items, if the determination unit determines that none of the plurality of items includes an item for which the information that defines the file name to be unique is set, upon changing information set for the target item.

According to a second aspect of the present invention, there is provided an information processing apparatus, comprising: a setting unit configured to set an image file naming rule by setting each of a plurality of items that configure a file name; a determination unit configured to determine whether or not any one of the plurality of items includes an item for which information that defines the file name to be unique is set; and a changing unit configured to change information set for an item other than a target item of the plurality of items to information that defines the file name to be unique, if the determination unit determines that none of the plurality of items includes the item for which the information that defines the file name to be unique is set upon changing information set for the target item.

According to a third aspect of the present invention, there is provided an information processing apparatus, comprising: a setting unit configured to set an image file naming rule by setting each of a plurality of items that configure a file name; a determination unit configured to determine whether or not any one of the plurality of items includes an item in which information that defines the file name to be unique is set; and a prohibition unit configured to prohibit a change of information set for a target item of the plurality of items, if the determination unit determines that none of the plurality of items includes the item for which the information that defines the file name to be unique is set upon changing information set for the target item.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a functional block diagram for explaining a software module configuration of the file server according to the first embodiment.

FIG. 6 depicts a view for explaining an example of destination information stored in a destination information manager of the MFP according to the first embodiment.

FIG. 7 depicts a view for illustrating an example of a file storing transfer setting information stored in a transfer setting information manager of the MFP according to the first embodiment.

FIG. 10A to FIG. 10C respectively depict views for illustrating examples of a setting screen for setting a file naming rule that the MFP according to the first embodiment displays.

FIGS. 19A and 19B respectively depict views for illustrating examples of file naming rule setting screens according to a second embodiment of the present invention.

FIG. 21 depicts a view for illustrating an example of a file naming rule setting screen according to a third embodiment of the present invention.

FIG. 23 depicts a view for illustrating an example of a file naming rule setting screen according to a fourth embodiment of the present invention.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

First Embodiment

Firstly, explanation will be given for a first embodiment according to the present invention. In the first embodiment, explanation is given for an example of fax document transfer setting processing and fax reception accompanying file transfer processing, in a system including an MFP as an example of an image forming apparatus of the present invention and a file server having a file storage function.

Figure 1:
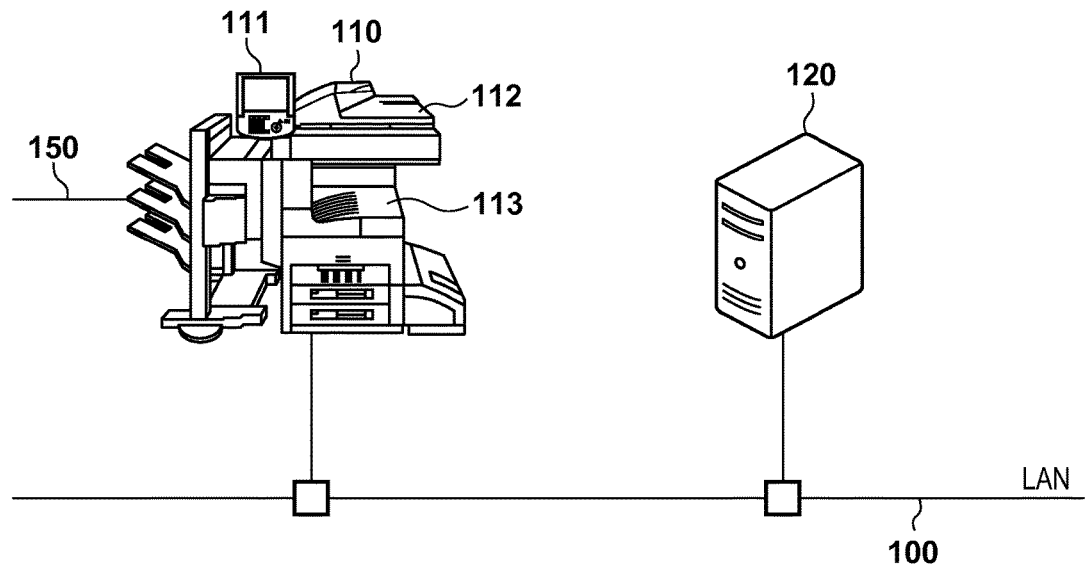
FIG. 1 depicts a view for illustrating an overall configuration of an information processing system according to a first embodiment of the present invention.

FIG. 1 depicts a view for illustrating an overall configuration of an information processing system according to the first embodiment of the present invention.

An MFP (multi-function peripheral) 110 and a file server 120 are connected via a LAN 100 in the information processing system.

The MFP 110 is a multi-function peripheral (a multifunction processing apparatus) comprising a console unit 111, a scanner unit 112, and a printer unit 113 and is capable of fax reception by connecting to a telephone public circuit network 150. In the information processing system according to the first embodiment, the MFP 110 is used as a receiving terminal for fax documents. The file server 120 stores and manages a received file with a designated file name and a folder name along with performing authentication of a terminal connected to the LAN 100. However, the number of devices in the system according to the first embodiment is not limited to the number of configuration devices in FIG. 1. For example, by having the function of the file server within the MFP 110, the MFP and the file server may be configured in the same apparatus. Also, the file server may be configured as a server on the Internet, or as a cloud system.

Figure 2:
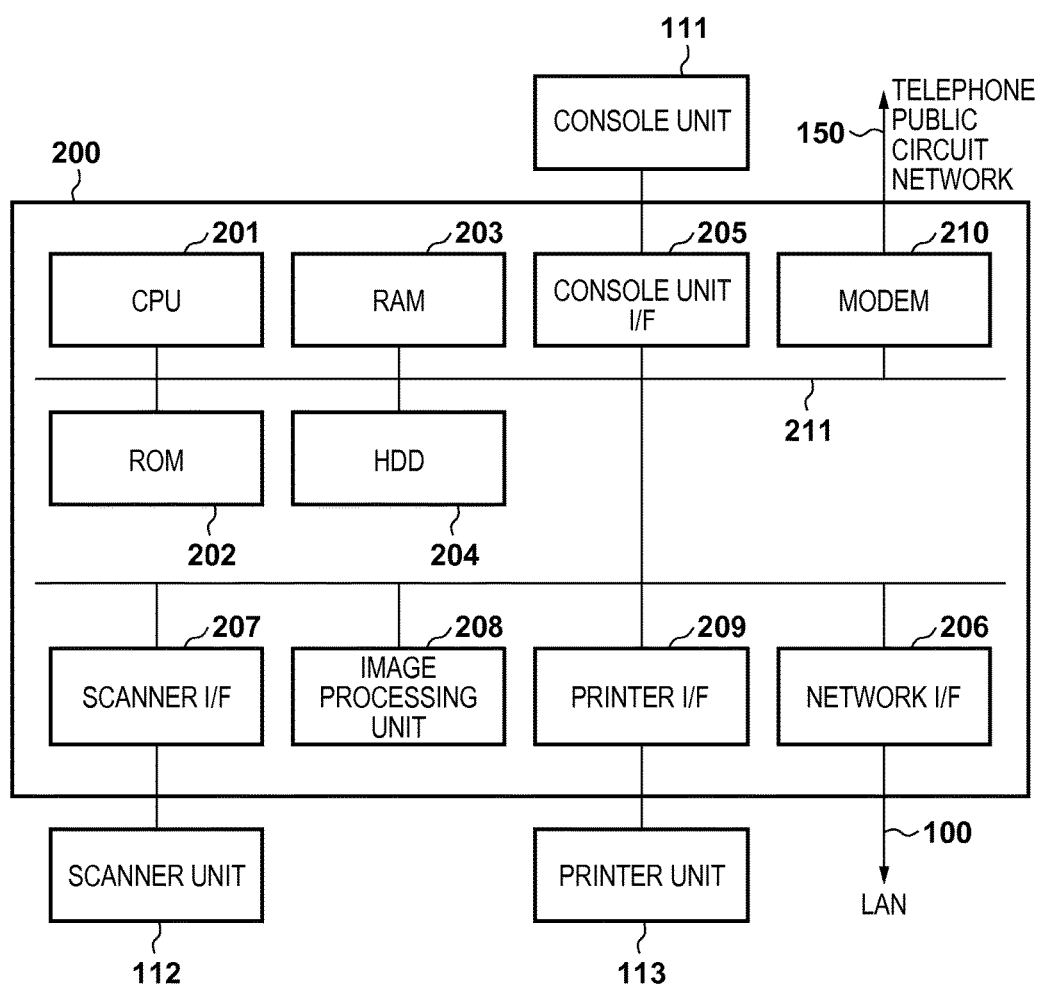
FIG. 2 is a block diagram for explaining a hardware configuration of an MFP according to the first embodiment.

FIG. 2 is a block diagram for explaining a hardware configuration of the MFP 110 according to the first embodiment.

A console unit 111 comprises of a display unit having a touch panel function, various hard keys, or the like, and according to data from a control unit 200 displays information for a user or inputs information in response to a user operation on the console unit 111 to the control unit 200. The scanner unit 112 reads images of originals, generates image data for the images, and supplies the image data to the control unit 200. The printer unit 113 prints images onto sheets (sheets of paper, etc.) based on the image data received from the control unit 200.

The control unit 200 is connected electrically to the console unit 111, the scanner unit 112, and the printer unit 113, and is connected to the LAN 100 via a network interface (I/F) 206. With this, communication via the LAN 100 in accordance with a communication protocol such as TCP/IP is possible. In the control unit 200, a CPU 201 is connected to a ROM 202, a RAM 203, an HDD 204, a console unit I/F 205, the network I/F 206, a scanner I/F 207, an image processing unit 208, and a printer I/F 209, through a system bus 211. The CPU 201 executes a boot program in the ROM 202, deploys an OS and control programs stored in the HDD 204 into the RAM 203, and controls the MFP 110 comprehensively in accordance with those programs. This control includes execution of programs for realizing later-described flowcharts. In the ROM 202, the boot program and various data of the MFP 110 are stored. The RAM 203 provides a work memory for the CPU 201 to operate, and provides an image memory to temporarily store received image data or the like. The HDD 204 is a hard disk drive, and stores an OS, various programs, and image data. The console unit I/F 205 is an interface unit for connecting the system bus 211 and the console unit 111. The network I/F 206 is connected to the LAN 100 and the system bus 211, and performs input and output of information via the network (LAN) 100. The scanner I/F 207 controls an interface between the scanner unit 112 and the control unit 200. The image processing unit 208 performs image processing such as rotation, color conversion, and image compression/decompression processing with respect to image data input from the scanner unit 112 and image data output to the printer unit 113. The printer I/F 209 receives image data processed by the image processing unit 208, and controls printing by the printer unit 113 in accordance with attribute data attached to the image data. A modem 210 is connected to the telephone public circuit network 150 and the system bus 211, and performs transmitting/receiving of facsimiles with an external fax terminal (not shown) via the telephone public circuit network 150. Note that in the first embodiment, explanation is given for an example of the MFP 110, which is capable of a UI display using the console unit 111, but in place of the MFP 110, for example, an information processing apparatus such as a general-purpose computer, or some other image processing apparatus may be used.

Figure 3:
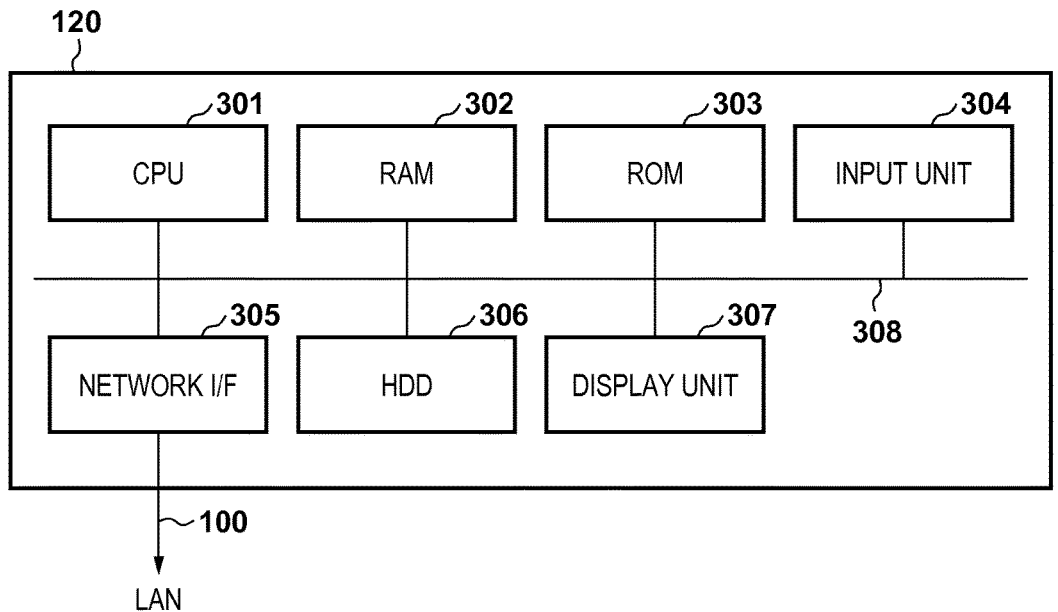
FIG. 3 is a block diagram for describing a hardware configuration a file server according to the first embodiment.

FIG. 3 is the block diagram for describing a hardware configuration of the file server 120 according to the first embodiment.

The file server 120 comprises a CPU 301, a RAM 302, a ROM 303, an input unit 304, a network I/F 305, a hard disk drive (HDD) 306, and a display unit 307, which are connected communicably with each other through a system bus 308. The ROM 303 stores a boot program, and upon a powering on, the CPU 301 reads the boot program, and deploys into the RAM 302 an OS, control program, or the like, which are installed in the HDD 306. Functions of the file server 120 are realized by the CPU 301 then executing programs deployed into the RAM 302. Also, the CPU 301 performs communication with other apparatuses on the LAN 100 that are connected via the network I/F 305. The input unit 304 includes a keyboard, a pointing device, or the like, and accepts instructions from a user. The display unit 307 performs display of menu screens, messages, or the like, to the user. Note that the display unit 307 may have a touch panel function.

Figure 4:
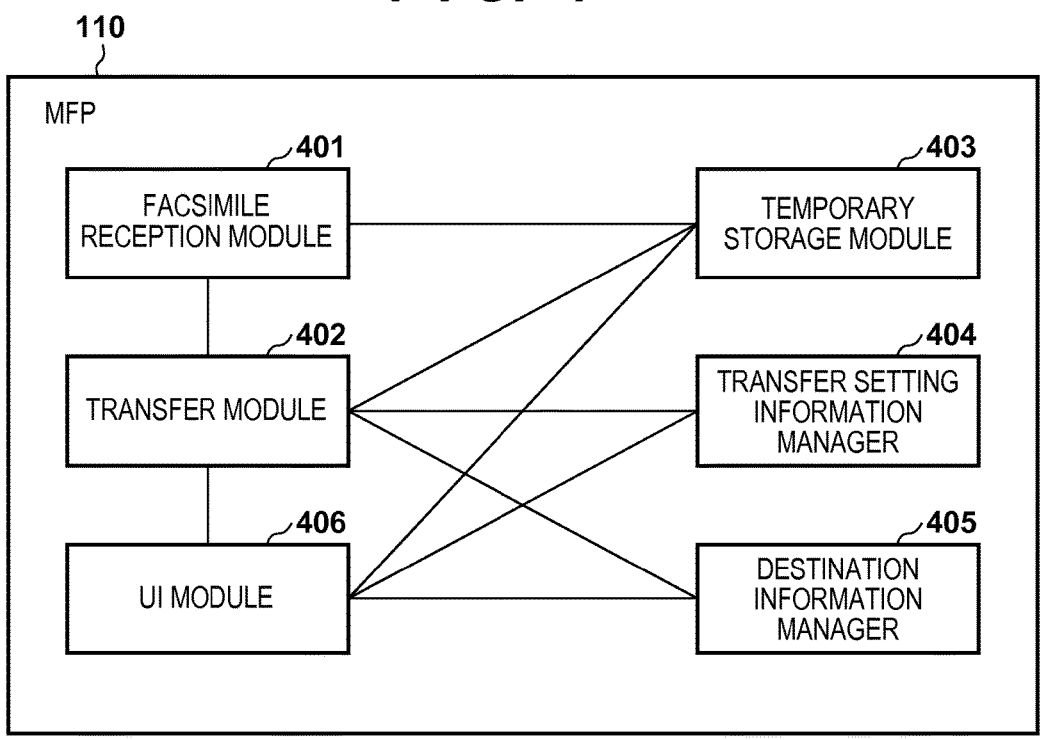
FIG. 4 is a functional block diagram for explaining a software module configuration of the MFP according to the first embodiment.

FIG. 4 is a functional block diagram for explaining a software module configuration of the MFP 110 according to the first embodiment. These software modules are installed on the HDD 204 of the MFP 110, and are executed under the control of the CPU 201 having been deployed into the RAM 203 upon execution.

A facsimile reception module 401 performs reception processing upon a fax reception by the modem 210. The facsimile reception module 401 receives facsimile data received through the modem 210, prepares a fax document by translation into a PDF or the like, and then saves the fax document to the HDD 204 as an image file by a temporary storage module 403. Also the facsimile reception module 401 generates a control file including a reception date and time, which is a date/time when the fax reception is performed, and a transmission source number, and a telephone number of an external fax terminal (not shown) that is connected via the telephone public circuit network 150. Then, the control file, along with the image file (the fax document) are saved in the HDD 204. Note that in the embodiment the expression "fax document" is used, but "fax document" encompasses a typical image.

A transfer module 402 transfers an image file saved in the HDD 204 by the facsimile reception module 401 to the file server 120. The transfer module 402 reads the reception date and time and the transmission source number from the control file that the facsimile reception module 401 saved to the HDD 204. Also, the transfer module 402 obtains transfer setting information, which is explained later with reference to FIG. 7, from a transfer setting information manager 404. Also, the transfer module 402 transmits a transmission source number to a destination information manager 405, and obtains a registration name corresponding to the transmission source number from a telephone number of the destination information explained later with reference to FIG. 6.

FIG. 6 depicts a view for explaining an example of the destination information stored in the destination information manager 405 of the MFP 110 according to the first embodiment.

The destination information is something that a user registers in advance to the destination information manager 405 via the console unit 111 of the MFP 110. Numerals 601 to 603 and 607 illustrate columns of data records of row 604 to row 606. A destination ID 601 is an identifier for identifying each destination uniquely. A registration name 602 indicates a user name of the destination. A telephone number 603 indicates a transmission source number (a telephone number) at a time of fax reception that corresponds to the registration name 602. An address book name 607 indicates a group of a destination table (address book) to which the destination corresponding to the registration name 602 belongs.

FIG. 7 depicts a view for illustrating an example of a file that stores transfer setting information stored in the transfer setting information manager 404 of the MFP 110 according to the first embodiment.

Items set in a file server setting screen of FIG. 9, file naming rule setting screens of FIGS. 10A-10C, and a folder naming rule setting screen of FIG. 11, explained later are stored in this file. These setting screens will be explained in detail later. Note that a format of these files may be CSV, XML, or another format, and the format is irrelevant.

A hostname 701 indicates a host name of the file server 120. In the view, "sharedserver" is designated as the host name of the file server 120. Note that an IP address of the file server 120 may be used as the host name. A folderpath 702 indicates a path that is the starting point of a storage destination folder of the transferred image file. In the figure "root" is designated as the storage destination folder path. A username 703 indicates a login user name for authenticating towards the file server 120. In FIG. 7, "administrator" which indicates an administrator is designated as the login user name. A password 704 indicates a password for authenticating towards the file server 120. In the figure "32942xc45" is designated as the password. Note that the character string of the password may be obfuscated using an encryption method such as hashing. A filenamerule 705 indicates a file naming rule when saving an image file in the file server 120. A foldernamerule 706 indicates a folder path naming rule when saving an image file in the file server 120. These will be explained in detail later.

The transfer module 402 generates a file name of an image file transmitted to the file server 120 based on the filenamerule 705, the registration name, the (transmission source) telephone number, a reception date and time, the address book name, a line name, a serial number, a random number, or the like. Also the transfer module 402 generates a folder name of the image file transmitted and saved in the file server 120 based on the foldernamerule 706, the registration name, the (transmission source) telephone number, and the reception date and time. Then, the transfer module 402 reads an image file saved in the HDD 204, adds the above described file name and folder name to the image file and transmits these to the file server 120 designated by the hostname 701. Also the transfer module 402 is capable of performing a later explained test transmission using a telephone number and a reception date and time received from a UI (user interface) module 406 and a fax document for testing saved in the HDD 204 in advance, with similar processing to the previously explained file transfer processing.

The temporally storage module 403 receives the control file and the image file and saves and manages these in the HDD 204. The transfer setting information manager 404 saves and manages in the HDD 204 the transfer setting information as shown in FIG. 7, for example, which is set by the UI module 406, which is described later. Also, the transfer setting information manager 404 transmits saved transfer setting information to the transfer module 402 in accordance with a request from the transfer module 402. The destination information manager 405 saves and manages in the HDD 204 the destination information as shown in FIG. 6, for example, which is set by the UI module 406, which is described later. The UI module 406 displays various screens on the display unit of the console unit 111 via the console unit I/F 205, and detects the content input by the user via the touch panel function, the pointing device, the hardware keys, or the like, of the console unit 111. Also the UI module 406 displays a status display screen explained later with reference to FIG. 8 on the console unit 111 and accepts a user input for instructing whether or not the transfer setting is performed. Also, the UI module 406 displays a file server setting screen which is explained later with reference to FIG. 9, obtains file server settings input by the user, transmits them to the transfer setting information manager 404, and requests saving of the file server settings. Furthermore, the UI module 406 displays on the console unit 111 a setting screen for file naming rules which is later explained with reference to FIG. 10A to FIG. 10O, obtains file naming rules input by the user, transmits them to the transfer setting information manager 404, and requests the saving of the file naming rules. Furthermore, the UI module 406 displays on the console unit 111 a setting screen for folder naming rules which is later explained with reference to FIG. 11, obtains folder naming rules input by the user, transmits them to the transfer setting information manager 404, and requests the saving of the folder naming rules. Also the UI module 406 displays a test transmission screen explained later with reference to FIG. 12 on the console unit 111, obtains and transmits to the transfer module 402 a telephone number and a reception date and time of the transmission source inputted by a user, and requests a test transmission.

FIG. 5 is a functional block diagram for explaining a software module configuration of the file server 120 according to the first embodiment. These software modules are stored in the HDD 306 of the file server 120, deployed into the RAM 302 upon execution, and executed under the control of the CPU 301.

A communication module 501 comprising of a file transmission service such as SMB (Server Message Block) or WebDAV (Web-based Distributed Authoring and Versioning). The communication module 501 accepts requests via the LAN 100, performs processing, and then makes a response with the processing result. An authentication module 502 performs a client (the MFP 110 herein) authentication based on authentication information included in a request to a file transmission service. A file manager 503 performs management of a file stored in the HDD 306 in response to a request to the file transmission service. The file manager 503 saves an image file in the HDD 306 or reads the image file in accordance with the folder name and the file name received from the MFP 110 through the communication module 501. Also, the file manager 503 confirms whether or not a folder having a folder name received from the MFP 110 via the communication module 501 exists in the HDD 306. Also, the file manager 503 generates folders in the HDD 306 in accordance with folder names received from the MFP 110 via the communication module 501.

Next, with reference to FIG. 7, explanation will be given for the filenamerule 705 which is a file naming rule for when saving an image file in the file server 120.

The format of the naming rule is stored in the format of [item name 1], separator ("_" here), [item name 2], separator ("_" here), [item name 3]. In a case where a new item name is added, a separator "_" and an additional item name are added to the existing naming rule, for example. In a case where "an item name 4" is further added in FIG. 7, the naming rule becomes "[item name 1]_[item name 2]_[item name 3]_[item name 4], for example. Also, the item name "REGISTNAME" corresponds to the registration name 602 in FIG. 6, the item name "FAXNUMBER" corresponds to the telephone number 603 in FIG. 6, and "DATE" indicates a reception date and time. Also, though not shown graphically, the item name "ADDRESSLISTNAME" indicates the address book name 607, and the item name "LINENAME" indicates a line name. Also, the item name "SERIAL" indicates a serial number that the system generates, and more specifically is a number such as "00000001", and a different serial number is set every time. The item name "RANDOM" indicates a random number that the system generates, which is an alphanumeric value such as "a761232ed4211cebacd00aa0057b223" for example, and a random alphanumeric value that is different every time is set. In FIG. 7, "[REGISTNAME]_[FAXNUMBER]_[DATE]" is designated as the file naming rule, and in this case, "{registration name}_{(transmission source) telephone number}_{reception date and time}" is the file name.

The foldernamerule 706 indicates a folder path naming rule when saving an image file in the file server 120. The format of the naming rule is stored in the format of [item name 1] path separator symbol ("/" here) [item name 2] path separator symbol ("/" here) [item name 3]. When newly adding an item name, a path separator symbol ("/") and an added item name are added to the existing naming rule. For example, in a case where "the item name 4" is added, the naming rule of the folder path becomes "[item name 1]/(path separator symbol)[item name 2]/[item name 3]/[item name 4]". Also, the item name "REGISTNAME" indicates a registration name, the item name "FAXNUMBER" indicates a telephone number of a transmission source, and "DATE" indicates a reception date and time. In FIG. 7, "[REGISTNAME]/[FAXNUMBER]/[DATE]" is designated as the naming rule of the folder path, and "{registration name}/{telephone number}/{reception date and time}" is the folder path of the saving destination.

Figure 8:
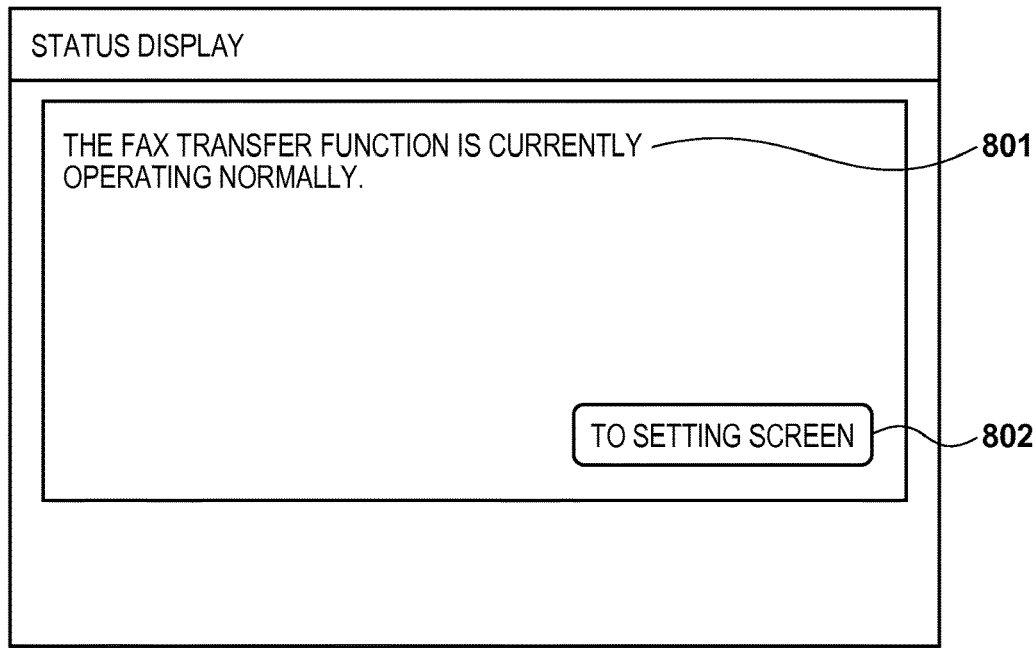
FIG. 8 depicts a view for illustrating an example of a status display screen displayed on a console unit of the MFP according to the first embodiment.

FIG. 8 depicts a view for illustrating an example of a status display screen displayed on the console unit 111 of the MFP 110 according to the first embodiment.

Figure 13:
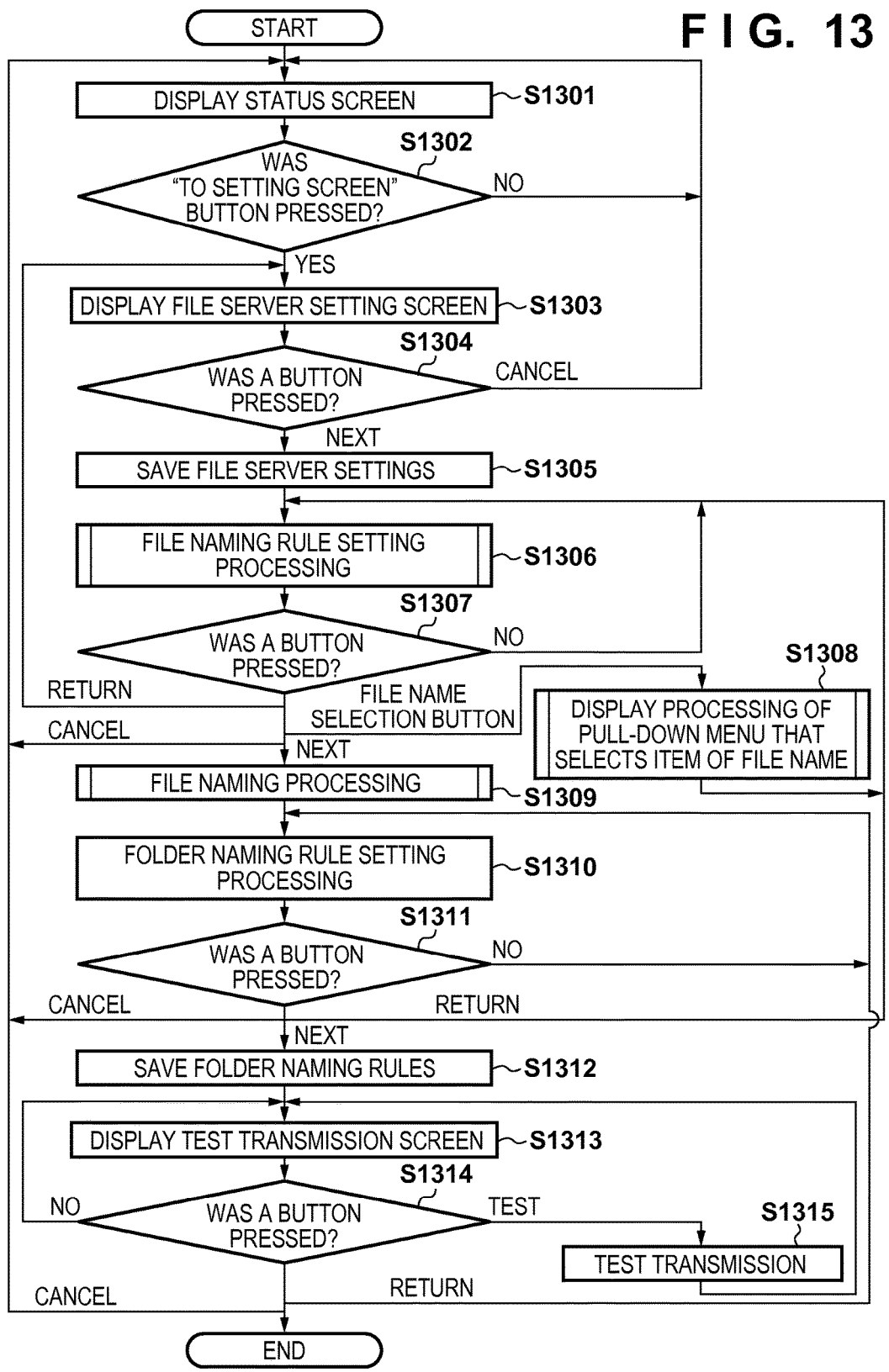
FIG. 13 is a flowchart for describing file server setting, and file naming rule and folder naming rule setting processing by the MFP according to the first embodiment.

In a status display 801, operation statuses of software modules of FIG. 4 which are operating on the MFP 110, and of the MFP 110 are displayed. When the UI module 406 performs a display of the status display screen, the UI module 406 confirms the operation statuses of the software modules of the MFP 110 and the system modules. Then, the UI module 406 displays to the effect that operation is normal when the software modules of the MFP 110 and the system modules are operating normally, and when an abnormality is occurring, the UI module 406 displays a status of a software module or a portion thereof for which the abnormality is occurring. A "to setting screen" button 802 instructs to transition to a screen for changing the transfer setting information managed by the transfer setting information manager 404 of the MFP 110. When the user presses (instructs) the "to setting screen" button 802, processing for changing a transfer setting explained later with reference to FIG. 13 is activated and transition is made to a file server setting change screen shown in FIG. 9.

Note that a GUI button for updating the status display 801 in accordance with the latest state of the software modules of the MFP 110 and the operation statuses of the modules of the MFP 110 may be arranged on the status display screen shown in FIG. 8.

Also in the first embodiment, configuration is made to transition to the file server setting screen in FIG. 9 when the "to setting screen" button 802 is pressed, but GUI buttons to directly transition to each screen in FIGS. 10A-10C, FIG. 11, and FIG. 12 described later may be arranged on the status display screen.

Figure 9:
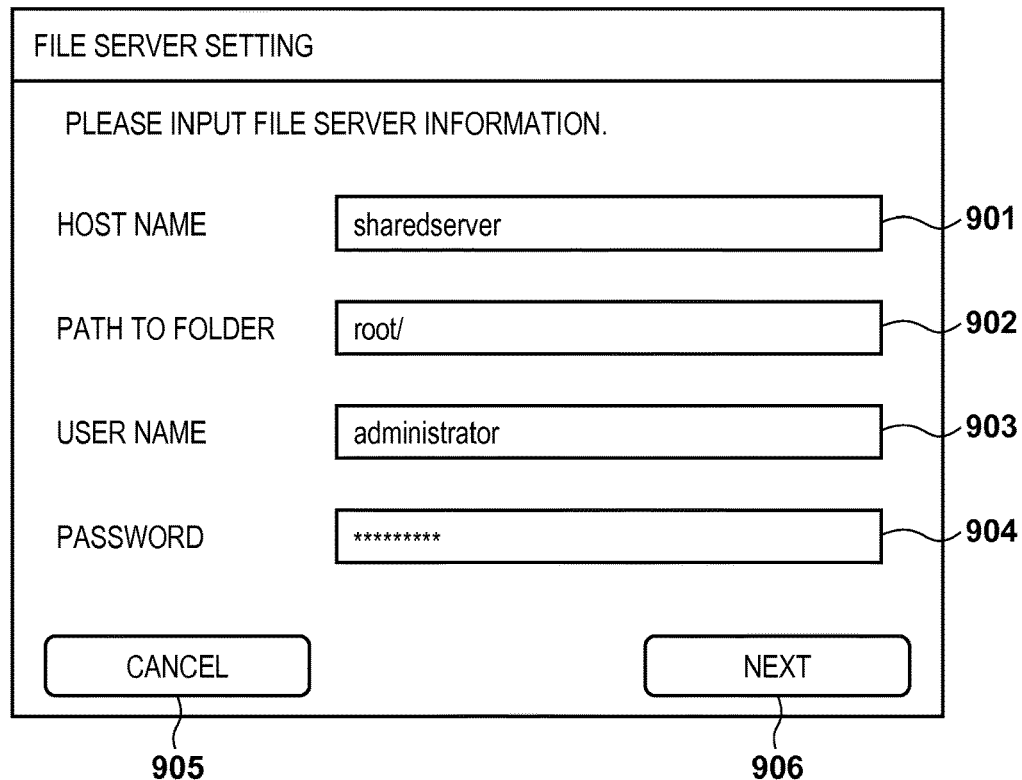
FIG. 9 depicts a view for illustrating an example of a file server setting screen that the MFP according to the first embodiment displays.

FIG. 9 depicts a view for illustrating an example of a file server setting screen that the MFP 110 according to the first embodiment displays.

A host name input box 901 is an input field for inputting a host name of the file server 120 which is a transfer destination of an image file (fax document). A name that is input into the host name input box 901 is transmitted to the transfer setting information manager 404 by the UI module 406 of the MFP 110, and saved as the hostname 701 (FIG. 7) of the transfer setting information. A folder path input box 902 is an input field for inputting a folder name for the file server 120, which is a transfer destination for an image file. A name input into this input box 902 is transmitted to the transfer setting information manager 404 by the UI module 406 of the MFP 110, and saved as the folderpath 702 (FIG. 7) of the transfer setting information. A login user name input box 903 is an input field for inputting a login user name that is necessary for authentication on the file server 120, which is the transfer destination of the image file. A name that is input into this input box 903 is transmitted to the transfer setting information manager 404 by the UI module 406 of the MFP 110, and saved as the username 703 (FIG. 7) of the transfer setting information. A login password input box 904 is an input field for inputting a login password that is necessary for authentication on the file server which is the transfer destination of the image file. In this input box 904, "*" is displayed for input text in order to hide the content that the user inputs. The display of the input text is not limited to "*", and may be another symbol such as "•" for example; alternatively the text may be displayed without hiding it. The password input in the input box 904 is transmitted to the transfer setting information manager 404 by the UI module 406 of the MFP 110, and is saved as the password 704 in the transfer setting information (FIG. 7). A cancel button 905 is a button for cancelling the changes on transfer setting information with this screen. When a user presses the cancel button 905, a transfer setting change made via this screen is cancelled, and transition is made to the status display screen of FIG. 8.

A next button 906 is a button for changing the setting of the file server in the transfer setting information, and for instructing to transition to the file naming rule setting screen as a next screen shown in either of FIGS. 10A-10C described later. When the user presses the next button 906, the file server settings input on the file server setting screen are transmitted to the transfer setting information manager 404 by the UI module 406 of the MFP 110, and the transfer setting information manager 404 saves those file server settings. Then the UI module 406 transitions to a file naming rule setting screen explained later with reference to FIGS. 10A to 10C.

Figure 11:
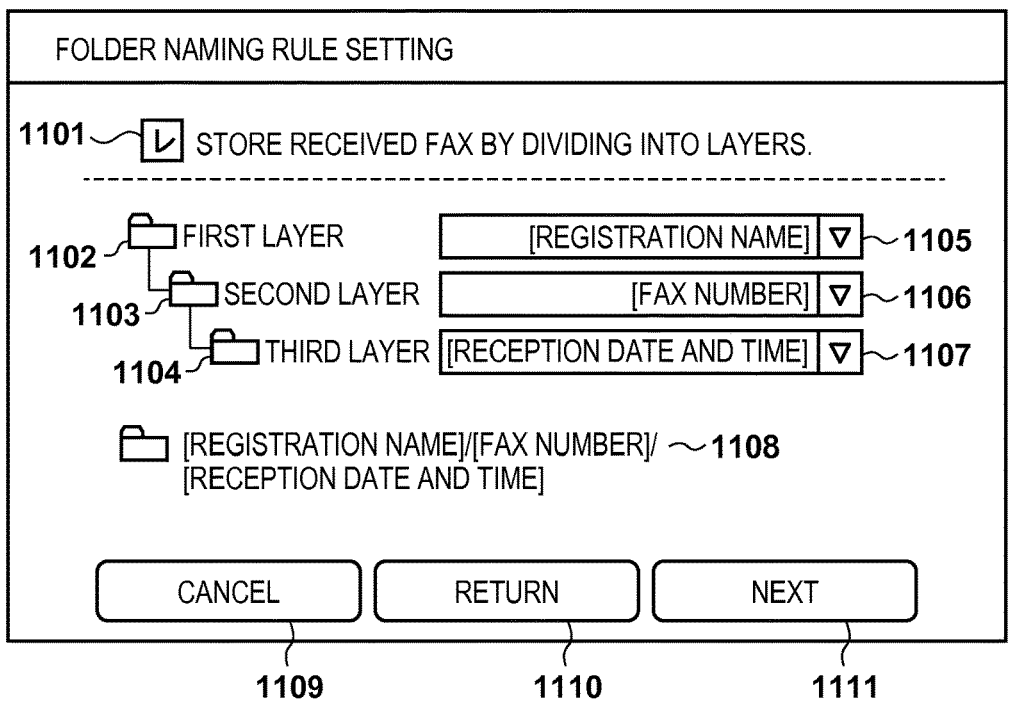
FIG. 11 depicts a view for illustrating an example of a setting screen for setting a folder naming rule that the MFP according to the first embodiment displays.
Figure 12:
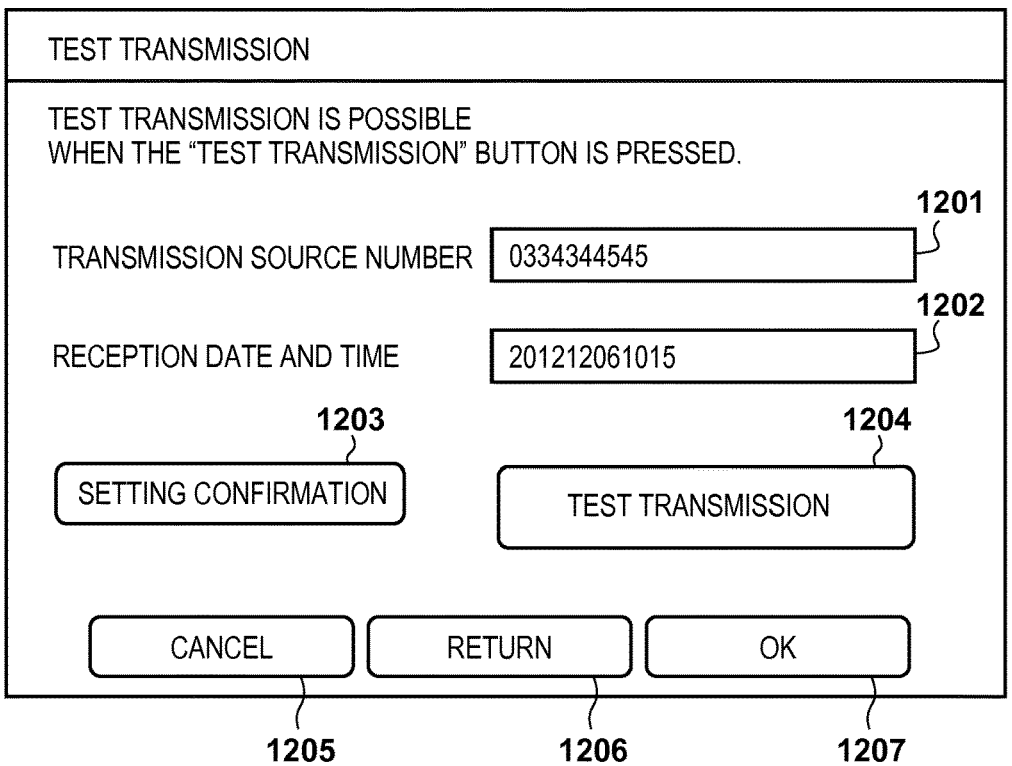
FIG. 12 depicts a view for illustrating an example of a test transmission screen that the MFP according to the first embodiment displays.

Also in the first embodiment, transitioning to any of the file naming rule setting screens in FIGS. 10A to 10C occurs when the next button 906 is pressed, but GUI buttons to directly transition to each screen in FIG. 11 and FIG. 12 may be arranged on the file server setting screen.

FIG. 10A to FIG. 10C depict views for illustrating examples of setting screens for setting a file naming rule that the MFP 110 according to the first embodiment displays. The file name of the image file that is transferred to the file server 120 is determined in accordance with the file naming rule that the user sets via the file naming rule setting screen.

FIG. 10A depicts a view for illustrating an example of a typical file naming rule setting screen.

The items 1001-1003 are areas for designating item names used for the file name from among the item names of the registration name, the telephone number, the reception date and time, the address book name, the line name, the serial number and the random number; here the registration name, the telephone number and the reception date and time are selected. Here, the item 1001 indicates the first item name of the file name, the item 1002 indicates the second item name of the file name, and the item 1003 indicates the third item name of the file name. Here, a method of selecting the file name of each item is provided by a pull-down menu. As options for each pull-down, there are "none", "registration name", "fax number", "reception date and time", "address book name", "line name", "serial number", and "random number". From these options, in the first embodiment "reception date and time", "serial number", and "random number" are information guaranteed to be unique (information that satisfies a predetermined condition). Note that "line name" is obtained as the registration name 602 corresponding to the telephone number 603 shown in FIG. 6, for example, based on a facsimile number designated as a transmission destination. The item 1004 is a pull-down menu that selects a symbol of a separator that indicates a separator of each item; as options of the separator there are "hyphen", "underscore", "space", or the like; it is possible to select one of these as the separator. The item 1005 is a preview display with which the user can confirm what kind of file name will be the result of designating the configuration of the file name by each item described above. The displayed content displays the file name in accordance with the selected items corresponding to items 1001-1004.

In FIG. 10A, a preview display of a file name when the item 1001 is designated as "reception date and time", the item 1002 as "fax number", the item 1003 as "registration name", and in the item 1004 "underscore" is designated as the separator is performed.

A cancel button 1006 instructs that details input via the setting screen be cancelled. When a user presses the cancel button 1006, transition is made to the status display screen shown in FIG. 8, for example. A return button 1007 instructs that the previous screen be returned to. When the user presses the return button 1007, transition is made to a file server setting screen shown in FIG. 9, for example. A next button 1008 instructs that the next screen be proceeded to. When the user presses the next button 1008, transition is made to a folder naming rule setting screen shown in FIG. 11, for example.

FIG. 10B shows an example of a screen when, in the screen of FIG. 10A, the pull-down button 1011 of the item 1001, on which "reception date and time" which is a unique value is selected, is pressed.

Here, the options displayed on the list of the pull-down menu 1009 are "reception date and time", "serial number", and "random number"; only items guaranteeing a unique value are displayed, because values of the items 1002 and 1003 are not unique. In other words, control is performed so that options through which a unique file name cannot be generated are caused to not be displayed, so that the file name does not become a name that is not unique. Thereby, regardless of which option of the pull-down menu 1009 is selected, a state in which the file name is always unique can be maintained. In addition, the status bar 1010 displays a reason why options displayed on the pull-down menu 1009 are restricted.

FIG. 10C depicts a screen that shows a state in which the pull-down button 1011 of the item 1001 is pressed while in a state in which all values of the selection items of items 1001-1003 were "none".

In an initial state or the like of the file naming rule setting screen, there is a case in which all values of the selection items are "none", and in such a case unique file names cannot be generated. Therefore, for options displayed in a pull-down menu 1012, similarly to the pull-down menu 1009 of FIG. 10B, configuration is taken so as to display only unique options, and unique file names are generated. At this point, the next button 1008 cannot be pressed as long as a unique item is not selected as the file name. Note that, in the first embodiment, the initial state of the file naming rule setting screen is where all values of the selection item are "none", but instead of "none", a specific item that guarantees a unique value may be set in advance. In such a case, because uniqueness of the file name can be ensured already in the initial state, processing in the above-described case in which all values of the selection item are empty is unnecessary.

FIG. 11 depicts a view for illustrating an example of a setting screen for setting a folder naming rule that the MFP 110 according to the first embodiment displays. The folder name of a file saved to the file server 120 is determined in accordance with the folder naming rule set on this screen.

A check box 1101 is a check-box for allowing a user to select whether or not to save an image file dividing into layers. When the box 1101 is checked, the folder name is generated by the naming rule set on this screen, and the image file is saved therein. When the box 1101 is not checked, the image file is saved directly below the folder path designated by the file server setting screen shown in FIG. 9.

Items 1102-1104 show layer names. Here a first layer 1102, a second layer 1103, and a third layer 1104 of the folder are included. Here, a method of selecting the folder name corresponding to each layer is provided by the pull-down menus 1105-1107. As options for each pull-down, "none", "registration name", "fax number", "reception date and time", "address book name", and "line name" are included. Also, when "none" is selected, it is indicated that none of the layers of the options thereafter are generated. For example, when "registration name" is selected for the first layer 1102 and "none" is selected for the second layer 1103, it is determined that the folder name of the second layer and items thereafter is not designated, and so the folder name becomes simply "registration name". A preview display 1108 shows a preview display of the folder name in accordance with the selection results for the items 1102-1104. In the example of FIG. 11, because "registration name" is selected in the first layer 1102, "fax number" in the second layer 1103 and "reception date and time" in the third layer 1104, the preview display 1108 becomes "[registration name]/[fax number]/[reception date and time]".

A cancel button 1109 instructs that a user operation via the setting screen be cancelled. When a user presses the cancel button 1109, transition is made to the status display screen shown in FIG. 8, for example. A return button 1110 instructs that the previous screen be returned to. When the user pressed the return button 1110, for example, a transition is made to a file naming rule setting screen shown in one of FIG. 10A to FIG. 10C. A next button 1111 instructs that the next screen be proceeded to. When the user presses the next button 1111, transition is made to the test transmission screen shown in FIG. 12, for example.

FIG. 12 depicts a view for illustrating an example of a test transmission screen that the MFP 110 according to the first embodiment displays.

A transmission source number input box 1201 is an input field for inputting information used as a transmission source telephone number when performing a transmission test. A telephone number input into the transmission source number input box 1201 is transmitted to the transfer module 402 by the UI module 406 of the MFP 110 and is used as a transmission source number (telephone number) upon a transmission test. A reception date and time input box 1202 is an input field for inputting a date/time used as the reception date and time for when performing a transmission test. A date/time input into the reception date and time input box 1202 is transmitted to the transfer module 402 by the UI module 406 of the MFP 110, and used as the reception date and time upon a transmission test.

A setting confirmation button 1203 is a button for transitioning to a setting confirmation screen (not shown) for displaying transfer setting information input via the setting screens of FIG. 9, FIG. 10A to FIG. 10C, and FIG. 11. When the user presses the setting confirmation button 1203, in accordance with the UI module 406 of the MFP 110, the setting confirmation screen for displaying the transfer setting information input via FIG. 9, FIG. 10A to FIG. 100 and FIG. 11 is displayed. A transmission test button 1204 is a button that instructs so as to perform a test transmission, by using the transfer setting information input via FIG. 9, FIG. 10A to FIG. 10C, and FIG. 11, and information input via the transmission source number input box 1201 and the reception date and time input box 1202. When the user presses the transmission test button 1204, the UI module 406 of the MFP 110 transmits the telephone number of the transmission source number input box 1201 and the date/time of the reception date and time input box 1202 to the transfer module 402, and a transmission test request is transmitted to the transfer module 402. When the transmission test button 1204 is pressed, the transfer module 402 assumes that a fax document was received with the received transmission source number and at the reception date and time, and performs test transmission to the file server 120. The transfer module 402 displays a transmission test result screen (not shown) for displaying the result of the test transmission when the test transmission completes.

A cancel button 1205 is a button for cancelling the transfer setting information settings. When a user presses the cancel button 1205, transition is made to the status display screen shown in FIG. 8, for example. A return button 1206 is a button for transitioning to the previous screen. When the user presses the return button 1206, transition is made to the folder naming rule setting screen of FIG. 11, which is the previous screen. An OK button 1207 is a button for completing the setting of the transfer setting information, and transitioning to the status display screen shown in FIG. 8. When the user presses the OK button 1207, the UI module 406 of the MFP 110 transitions to the status display screen shown in FIG. 8.

Note that in the first embodiment, a transmission source number used upon testing is input by the transmission source input box 1201, and the reception date and time is input by the reception date and time input box 1202. However, an input box, an input button, or the like, may be arranged in order to designate a fax document used for another transmission test.

FIG. 13 is a flowchart for describing file server setting, and file naming rule and folder naming rule setting processing by the MFP 110 according to the first embodiment. Note that the operations (steps) shown in this flowchart are realized by the CPU 201 of the MFP 110 deploying a control program stored in the HDD 204 into the RAM 203, and executing the control program. Also, this flowchart is executed when a user selects a control program that executes this flowchart via the console unit 111 of the MFP 110.

Firstly, in step S1301, the CPU 201 displays a status display screen such as the one shown in FIG. 8, for example. Next, the processing proceeds to step S1302, and the CPU 201 determines whether or not the "to setting screen" button 802 is pressed on the status display screen. If the "to setting screen" button 802 is pressed, the processing proceeds to step S1303, and the CPU 201 displays the file server setting screen shown in FIG. 9, for example. Then the user inputs a name, a path of a folder, or the like, of a file server which is a transfer destination, authentication information, or the like, via the file server setting screen.

Next, the processing proceeds to step S1304, the CPU 201 determines whether the user pressed the cancel button 905 or the next button 906 on the file server setting screen. If it is determined that the next button 906 has been pressed, the processing proceeds to step S1305, and if it is determined that the cancel button 905 has been pressed, the processing returns to step S1301. In step S1305, the CPU 201 stores setting information of the file server input via the file server setting screen (FIG. 9) into the HDD 204 of the MFP 110.

Next, the processing proceeds to step S1306, and the CPU 201 displays a setting screen for a file naming rule, for example as shown in FIG. 10A. Then, the user inputs the file naming rule setting information via this setting screen, and file naming rule setting processing is executed. Next, the processing proceeds to step S1307, and the CPU 201 determines which button the user pressed on the file naming rule setting screen. When a button is not pressed, step S1306 is executed. In step S1307, if a pull-down button corresponding to items 1001-1003 of FIG. 10A (file name selection button) is pressed, the processing proceeds to step S1308. Details of processing of step S1308 is described later with reference to the flowchart of FIG. 18. In step S1307, if it is determined that the next button 1008 has been pressed, the processing proceeds to step S1309. However, if it is determined that the cancel button 1007 has been pressed the processing proceeds to step S1301, and if it is determined that the return button 1008 has been pressed the processing proceeds to step S1303.

Figure 18:
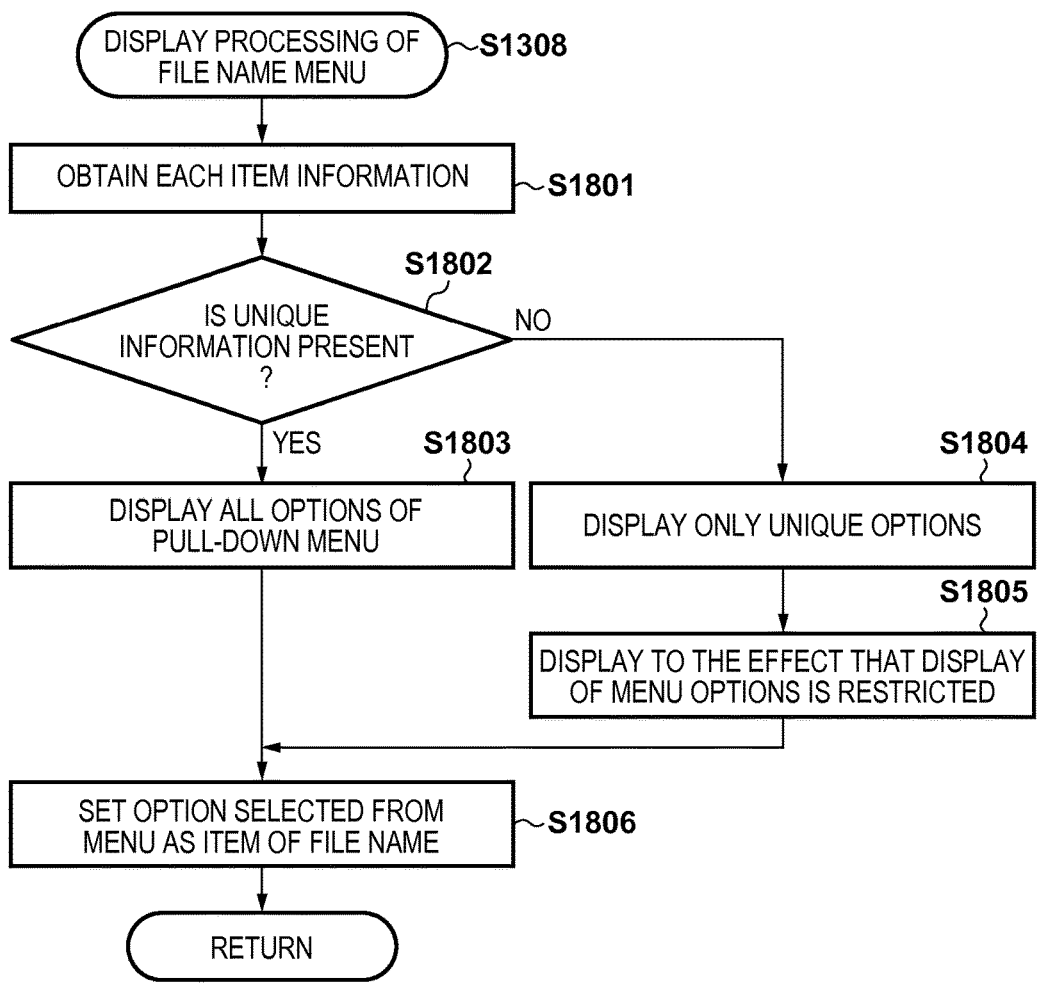
FIG. 18 is a flowchart for describing display processing of a file name pull-down menu in step S1308 of FIG. 13.

FIG. 18 is a flowchart for describing display processing of a file name pull-down menu in step S1308 of FIG. 13.

Firstly, in step S1801 the CPU 201, for example, obtains a value of each selection item of items 1001-1003 of the file naming rule setting screen of FIG. 10A. Note that, at this point, information of the selection item for which the file name selection button was pressed in step S1307 is not obtained. In other words, in the example of FIG. 10B, the information of the selection item of the item 1001 is not obtained. Next, the processing proceeds to step S1802, and the CPU 201 determines whether information by which the file name becomes unique is selected in the information of the selection items obtained in step S1801. Note that in the first embodiment information by which the file name becomes unique is "reception date and time", "serial number", or "random number", and in step S1802 it is determined whether one or more of these pieces of information is included. If it is determined that at least one piece of information to become unique is included, the processing proceeds to step S1803, the CPU 201 displays all options that are selectable as the file name on the pull-down menu, and the processing proceeds to step S1806.

However, is it determined in step S1802 that not even one piece of information by which the file name becomes unique is included, the processing proceeds to step S1804. In step S1804 the CPU 201 displays only options for which information is unique on the pull-down menu 1009, for example as shown in FIG. 10B, so that a unique file name can be generated. The processing proceeds to step S1805, the CPU 201 displays on the status bar 1010, for example as in FIG. 10B and FIG. 10C, to the effect that options displayed on the pull-down menu are restricted, and the processing proceeds to step S1806. In step S1806, the CPU 201 sets the information that the user selected from the pull-down menu as the item therefor, and processing terminates.

Once again, the explanation returns to FIG. 13.

In step S1309 the CPU 201 stores the information input via the file naming rule setting screen in step S1306 into the HDD 204 via the transfer setting information manager 404 of the MFP 110. Next, the processing proceeds to step S1310, and the CPU 201 displays a setting screen for a folder naming rule, for example as shown in FIG. 11. Then, the user inputs the folder naming rule setting information via this setting screen, and folder naming rule setting processing is executed. Next, the processing proceeds to step S1311, and the CPU 201 determines which button the user pressed on the folder naming rule setting screen. Here, if no button is pressed, step S1310 is executed. However, if it is determined in step S1311 that the user pressed the next button 1111, the processing proceeds to step S1312. Here, if the user pressed the cancel button 1109 the processing proceeds to step S1301, and if the user pressed the return button 1110 the processing proceeds to step S1306. In step S1312 the CPU 201, for example, stores the information that the user input via the setting screen for the folder naming rule in the HDD 204.

Next, the processing proceeds to step S1313, and the CPU 201 displays a test transmission screen, for example as shown in FIG. 12. Next, the processing proceeds to step S1314, and the CPU 201 determines which button the user pressed on the test transmission screen. Here, if the user does not press any button, step S1313 is executed. When it is determined that the user pressed the OK button 1207, the processing completes. However, if it is determined that the user pressed the cancel button 1205, the processing proceeds to step S1301. If it is determined that the user pressed the return button 1206, the processing proceeds to step S1310. Furthermore, if it is determined that the user pressed the transmission test button 1204, the processing proceeds to step S1315. In step S1315 the CPU 201 implements a transmission test based on details set via the file server setting screen (FIG. 9), the file naming rule setting screen (FIG. 10A to FIG. 10C), the folder naming rule setting screen (FIG. 11), and the test transmission screen (FIG. 12), and the processing proceeds to step S1313.

Next, explanation will be given for fax reception processing by the MFP 110 according to this embodiment. Below, explanation is given focusing on processing in which the MFP 110 receives a fax document, and transfers the fax document as an image file. Here, using previously explained transfer setting information (FIG. 7), and destination information (FIG. 6), the received fax document is transferred as an image file to the file server 120. At this time, the file name and the folder name of the fax document (image file) are generated and transferred to the file server 120. Note that the destination information is already registered to the destination information manager 405 by the user in advance via the console unit 111 of the MFP 110 as illustrated in FIG. 6. Here, an explanation of processing for registering the destination information is omitted.

Figure 14:
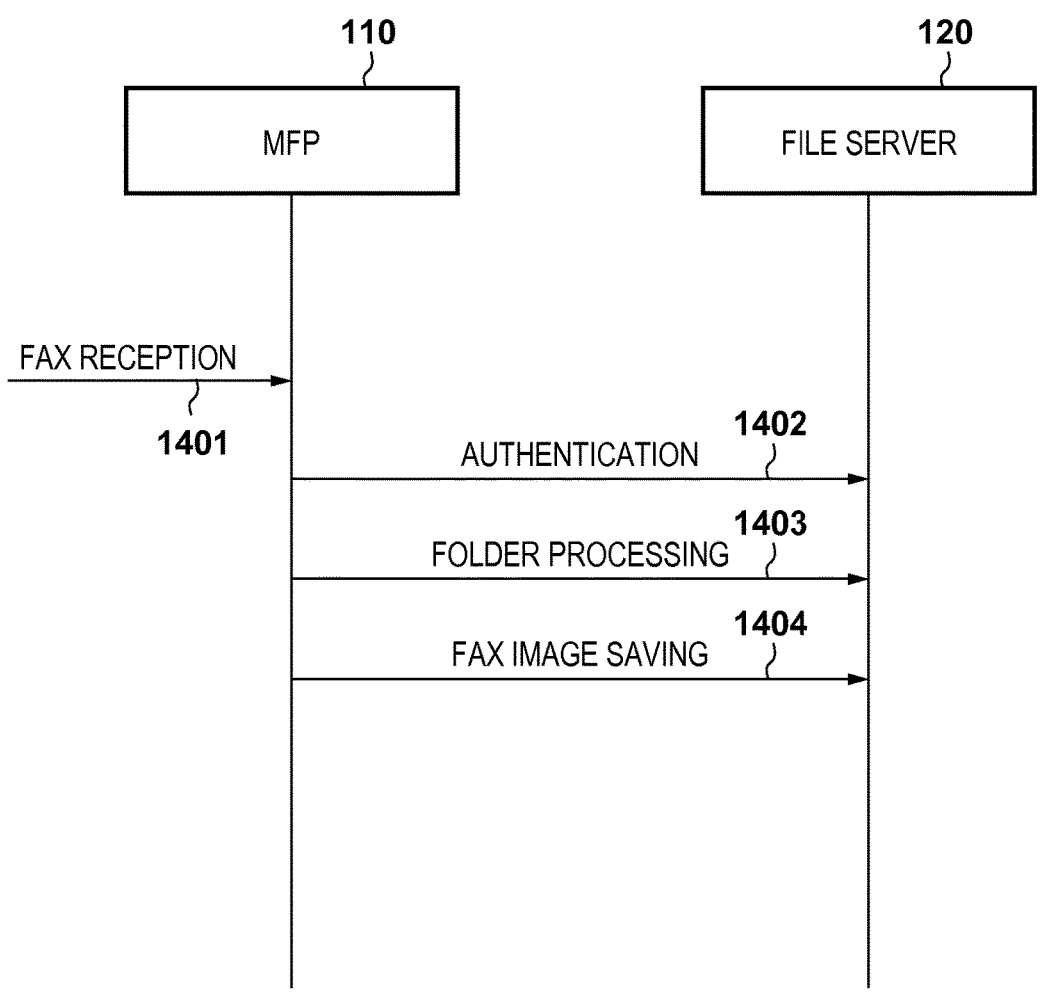
FIG. 14 is a sequence diagram for describing processing in which the MFP according to the first embodiment receives image data in a fax, and transfers an image file of the received image data to the file server.

FIG. 14 is a sequence diagram for explaining processing in which the MFP 110 according to the first embodiment performs fax reception of image data (document data), and transfers an image file of the image data that is received to the file server 120.

In reference numeral 1401, a fax image is sent from an external fax terminal to the MFP 110. When the MFP 110 receives the fax image, the facsimile reception module 401 and the transfer module 402 perform fax reception processing.

Figure 15:
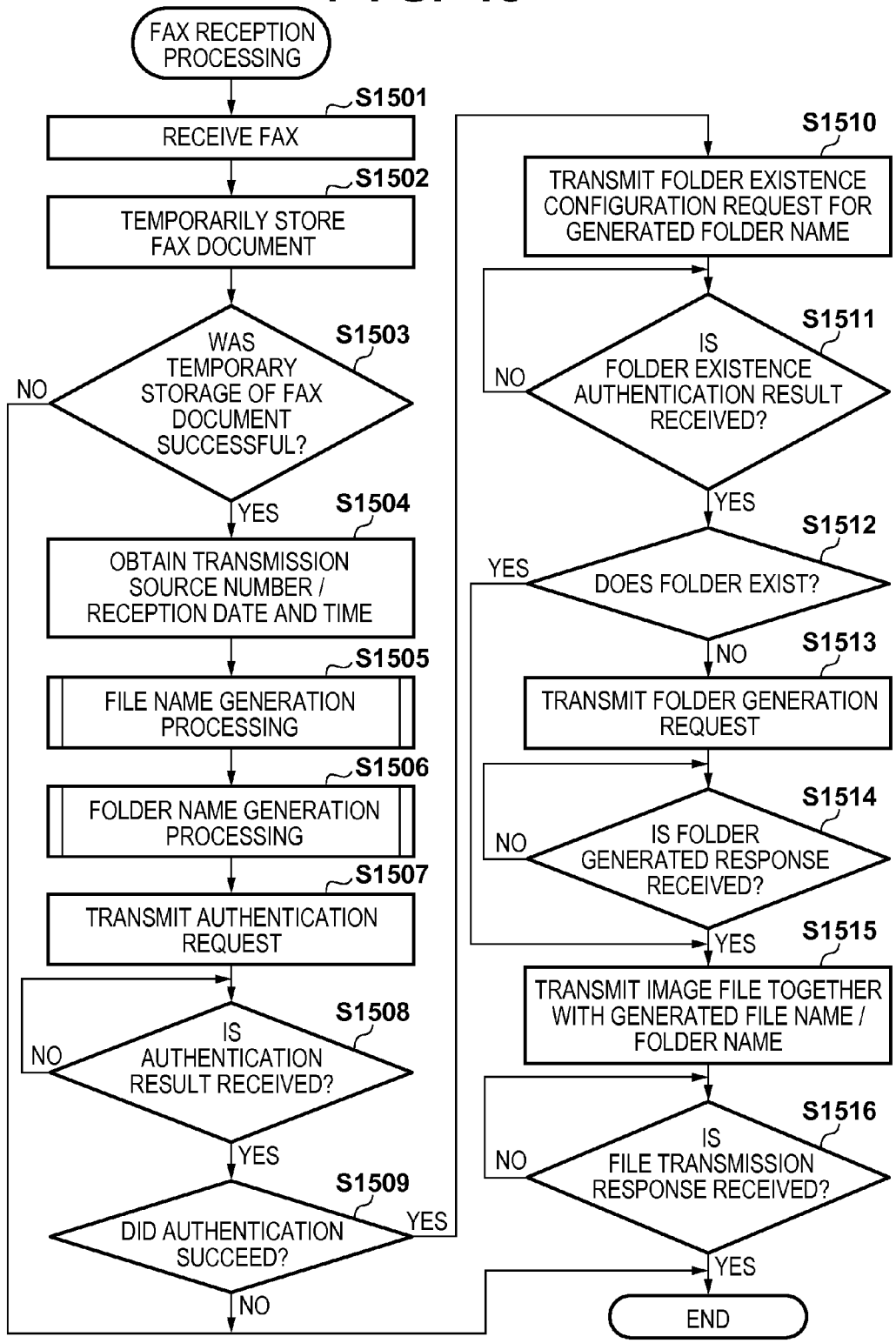
FIG. 15 is a flowchart for describing fax reception processing by the MFP according to the first embodiment.

FIG. 15 is a flowchart for describing fax reception processing by the MFP 110 according to the first embodiment. Note that the operations (steps) shown in this flowchart are realized by the CPU 201 of the MFP 110 deploying a control program stored in the HDD 204 into the RAM 203, and executing the control program.

Firstly, in step S1501 the CPU 201 uses the modem 210 to receive a fax document from an external fax terminal via the public switched telephone network 150. Also, the CPU 201 obtains a telephone number of the external fax terminal as a transmission source number using the modem 210, and further obtains a date/time at which the fax reception is performed as the reception date and time. Next, the processing proceeds to step S1502, and the CPU 201 translates the fax document received in step S1501 into an image file such as a PDF. In step S1502, the CPU 201 generates a control file that records the reception date and time and the telephone number of the transmission source obtained in step S1501. Then, the CPU 201 temporarily stores an image file including the fax document in the HDD 204 along with a control file.

Next, the processing proceeds to step S1503, and the CPU 201 determines whether or not the temporary storing of the image file to the HDD 204 succeeded. If it was possible to store the file, the processing proceeds to step S1504, and the CPU 201 obtains the transmission source telephone number, the reception date and time, or the like, stored temporarily on the HDD 204. Meanwhile, when the temporary storing of the image file failed, error processing is performed, and the processing completes. An example of when the temporary storing fails is when there is insufficient capacity in the HDD 204. Also, in the error processing here, together with causing the printer unit 113 to print the fax document by transmitting it to the printer unit 113 via the printer I/F 209, an error status is caused to be displayed by displaying the status display screen (FIG. 8) on the console unit 111.

Next, the processing proceeds to step S1505, and the CPU 201 generates a file name when transferring the image file to the file server 120 referencing the transmission source number and the reception date and time obtained in step S1504, the transfer setting information (FIG. 7), and the destination information (FIG. 6). Explanation is given with reference to the flowchart of FIG. 16 for details of processing of step S1505.

Figure 16:
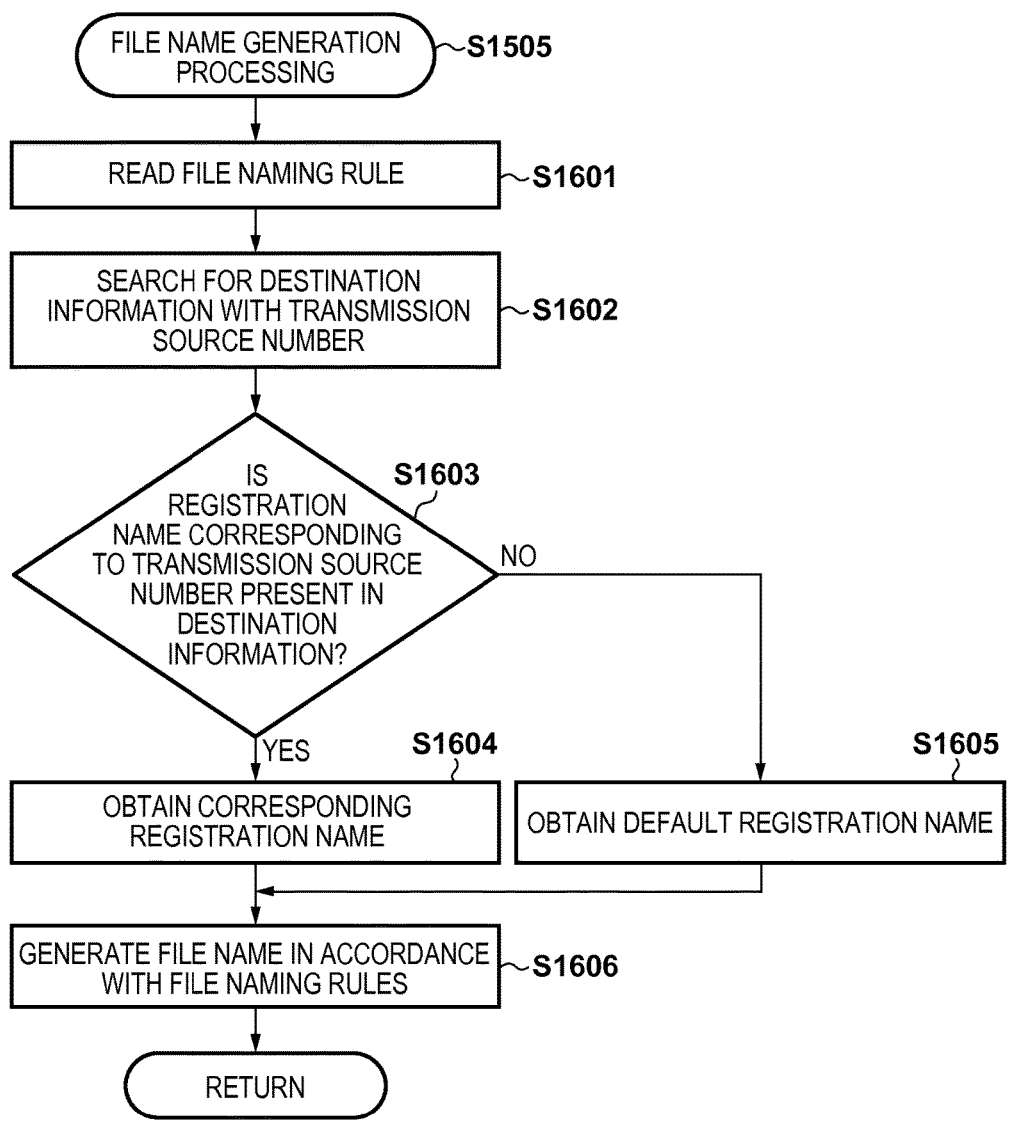
FIG. 16 is a flowchart for describing file name generation processing in step S1505 of FIG. 15 for a transferred image file.

FIG. 16 is a flowchart for describing file name generation processing in step S1505 of FIG. 15 for a transferred image file. Note that the operations shown in this flowchart are realized by the CPU 201 of the MFP 110 deploying a control program stored in the HDD 204 into the RAM 203 and executing the control program, and the performer of these operations is explained as the CPU 201.

Firstly, in step S1601, the CPU 201 obtains the filenamerule 705 (file naming rule) saved in the HDD 204. Next, the processing proceeds to step S1602, and the CPU 201 obtains destination information (FIG. 6) based on the telephone number. Here, the destination information is obtained by searching the registration name 602 with the telephone number 603 as a key. Next, the processing proceeds to step S1603, and the CPU 201 determines whether or not the registration name 602 corresponding to the telephone number 603 exists. When the registration name 602 exists, the processing proceeds to step S1604, the CPU 201 obtains the corresponding registration name, and the processing proceeds to step S1606. On the other hand, when the registration name 602 does not exist, the processing proceeds to step S1605, and the CPU 201 obtains a default registration name set in advance, and the processing proceeds to step S1606. Note, an example of the default registration name is when "not available", or the like, is set. Also, the default registration name may be saved in advance in the ROM 202 or the HDD 204. Also, configuration may be taken such that an input box for setting the default registration name is arranged on the file naming rule setting screen of FIG. 10, for example, and the user is able to change the default name. In step S1606, the CPU 201 generates a file name using the registration name, the telephone number of the transmission source, the reception date and time, the address book name, the line name, or the like, in accordance with the file naming rule obtained in step S1601.

Then, the processing proceeds to step S1506 of FIG. 15. In step S1506, the CPU 201 generates the folder name for transferring based on the telephone number of the transmission source and the reception date and time obtained in step S1504, the transfer setting information (FIG. 7) and the destination information (FIG. 6). Explanation is given with reference to the flowchart of FIG. 17 for details of processing of step S1506.

Figure 17:
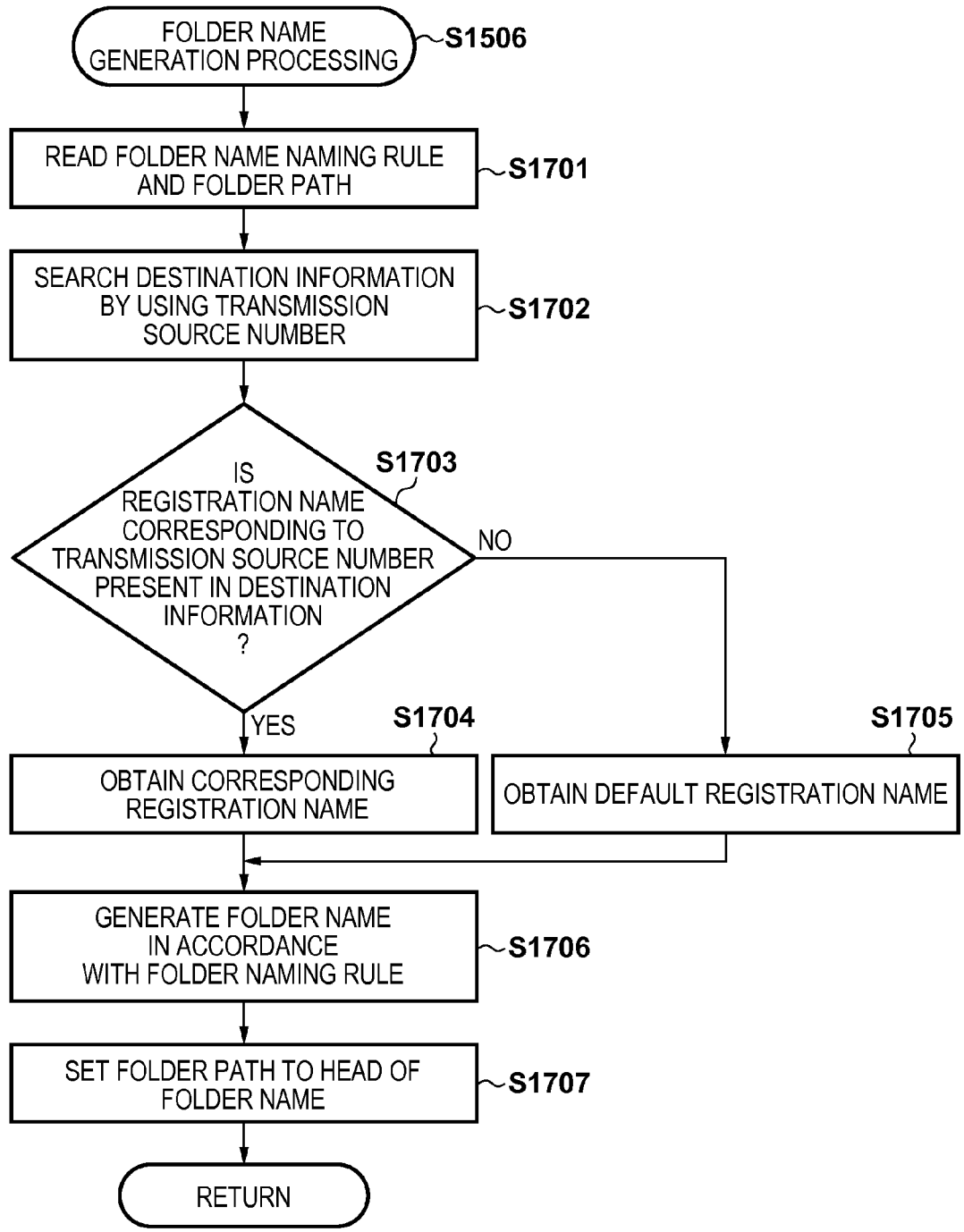
FIG. 17 is a flowchart for describing folder name generation processing in step S1506 of FIG. 15 of the file server on which the transferred image file is stored.

FIG. 17 is a flowchart for describing folder name generation processing in step S1506 of FIG. 15 of the file server 120 on which the image file transferred is stored. Note that the operations shown in this flowchart are realized by the CPU 201 of the MFP 110 deploying a control program stored in the HDD 204 into the RAM 203 and executing the control program, and the performer of these operations is explained as the CPU 201.

Firstly, in step S1701, the CPU 201 obtains the foldernamerule 706 saved in the HDD 204. Next, the processing proceeds to step S1702, and the CPU 201 obtains destination information, and obtains the corresponding registration name by searching for it using the telephone number obtained in step S1504 as the key. Then, the processing proceeds to step S1703, and the CPU 201 determines whether or not a registration name corresponding to the telephone number exists. When it is determined that it does exist, the processing proceeds to step S1704, and the CPU 201 obtains the corresponding registration name, and the processing proceeds to step S1706. Meanwhile, in step S1703, when it is determined that the registration name corresponding to the telephone number does not exist, the processing proceeds to step S1705, and the CPU 201 obtains the default registration name set in advance, and the processing proceeds to step S1706. Note, an example of the default registration name is when "not available", or the like, is set. Also, the default registration name may be saved in advance in the ROM 202 or the HDD 204. Also, configuration may be taken such that an input box for setting the default registration name is arranged on the folder naming rule setting screen of FIG. 11, for example, and so that a user is able to change the default name saved in the HDD 204 by user input.

In step S1706, the CPU 201 generates a folder name using the registration name, the telephone number of the transmission source, and the reception date and time in accordance with the foldernamerule 706 obtained in step S1701. Then, the processing proceeds to step S1707, and the CPU 201 sets the folder path to the head of the folder name, and the processing completes.

Next, once again the explanation returns to FIG. 14, and in reference numeral 1402, the MFP 110 performs authentication processing on the file server 120. This authentication processing is executed from step S1507 of FIG. 15.

In step S1507 of FIG. 15, the CPU 201 reads the transfer setting information (FIG. 7) from the HDD 204, and obtains the hostname 701, the username 703, and the password 704. Then, by the CPU 201, the address designated by the hostname 701 is accessed, and the username 703 and the password 704 are transmitted to the file server 120 along with the authentication request as the user name and the password respectively. Then, the processing proceeds to step S1508 of FIG. 15.

Once again, the explanation returns to FIG. 14. In reference numeral 1402, when the communication module 501 of the file server 120 receives an authentication request from the MFP 110, the communication module 501 obtains the user name and the password included in the authentication request and transmits them to the authentication module 502. The authentication module 502 performs a verification of the user ID and the password using authentication information saved in the HDD 306, and transmits the authentication result to the communication module 501. With this, the communication module 501 transmits the received authentication result to the MFP 110.

Thus, in step S1508 of FIG. 15, the CPU 201 determines whether or not the authentication result is received from the file server 120. When it is determined that the authentication result is not received, step S1508 is executed, and when the authentication result is received, the processing proceeds to step S1509, and the CPU 201 determines whether or not the authentication result received in step S1508 is an authentication success. When the CPU 201 determines that it is an authentication success, the processing proceeds to step S1510, and when that is not the case, error processing is performed, and the processing completes. In this error processing, a status display screen (FIG. 8) is displayed to the console unit 111, causing an error status to be displayed.

In reference numeral 1403 of FIG. 14, in a case where the MFP 110 succeeds at authentication, if a query as to whether or not a folder having the folder name generated in step S1506 exists on the file server 120 is made and no such folder exists, processing is performed to request generation of the folder. Here, the MFP 110 executes the processing of step S1510 of FIG. 15.

In step S1510, the CPU 201 transmits the folder name generated in step S1506 to the file server 120, and transmits an existence confirmation request for the file of that folder name.

Then, when, in reference numeral 1403 of FIG. 14, the communication module 501 of the file server 120 receives an existence confirmation request for the folder from the MFP 110, the communication module 501 transmits the folder name included in the folder existence confirmation request to the file manager 503, requesting folder existence confirmation processing. With this, the file manager 503 determines whether or not the folder having the received folder name exists in the HDD 306, and transmits that confirmation result to the communication module 501 as the folder existence confirmation result. With this, the communication module 501 transmits the folder existence confirmation result to the MFP 110. Then, the processing proceeds to step S1511 of FIG. 15.

In step S1511, the CPU 201 determines whether the folder existence confirmation result was received from the file server 120. When it is determined that the folder existence confirmation is not received, once again the processing proceeds to step S1511. When, in step S1511, it is determined that the folder existence confirmation is received, the processing proceeds to step S1512. In step S1512, the CPU 201 determines whether or not the folder having the folder name generated in step S1506 exists on the file server 120 from the folder existence confirmation received in step S1511. Here, when it is determined that a folder having the same name exists, the processing proceeds to step S1515, and when it is determined that a folder having the same name does not exist, the processing proceeds to step S1513.

In step S1513, the CPU 201 transmits the folder name generated in step S1506 to the file server 120, thereby performing a folder generation request.

Once again, the explanation returns to FIG. 14, and when, in reference numeral 1403, the communication module 501 of the file server 120 receives the folder generation request from the MFP 110, the communication module 501 transmits the folder name included in the folder generation request to the file manager 503, requesting the generation of the folder having the folder name. The file manager 503 generates the folder having the received folder name in the HDD 306, and transmits a response that it was generated to the communication module 501. When the communication module 501 receives the generated response, the communication module 501 transmits a folder generated response to the MFP 110.

In step S1514, the CPU 201 determines whether the folder generated response was received from the file server 120. When the folder generated response is not received, step S1514 is executed, and when the folder generated response is received, the processing proceeds to step S1515. In step S1515, the CPU 201 reads the fax document stored on the HDD 204, and transmits the file name generated in step S1505 along with the folder name generated in step S1506 to the file server 120, thereby transmitting a file save request.

This corresponds to reference numeral 1404 of FIG. 14. In reference numeral 1404, the MFP 110 transmits a fax document (image file), designating the file name generated in step S1505, and the folder name generated in step S1506 to the file server 120. Thus, when the communication module 501 of the file server 120 receives the file save request, the communication module 501 obtains the file, the folder name, and the file name from the file save request. Then, the communication module 501 transmits the obtained file, folder name, and file name to the file manager 503, and requests storage of the designated folder name and file name. The file manager 503 stores the received file in a designated location at the folder name and the file name in the HDD 306, and transmits a storage response to the communication module 501. The communication module 501 transmits the storage response to the MFP 110 as a file transmission response.

Thus, the CPU 201 determines whether the file transmission response is received from the file server 120 in step S1516 of FIG. 15. When the file transmission response is not received, the processing once again proceeds to step S1516, and when the file transmission response is received, the processing completes.

By virtue of the above explained processing, when the MFP 110 receives a fax, the MFP 110 generates a file name for the received image file (fax document) in accordance with a file naming rule of the transfer setting information, a transmission source number, a reception date and time, and a registration name of destination information corresponding to the transmission source number. Also, the MFP 110 generates a folder name in accordance with a folder path and a folder naming rule of the transfer setting information, a transmission source number, a reception date and time, and a registration name, or the like, of destination information corresponding to a transmission source number. Also, the MFP 110 performs an existence confirmation for the folder that is to be generated towards the file server 120, and if the same folder does not exist on the file server 120, the image file is stored at the location of the generated folder name and file name having performed a folder generation request.

By the first embodiment, as explained above, by setting a file naming rule and a folder naming rule in advance, it is possible to store an image file received in a fax in a desired folder on a file server by attaching a desired file name to the image file. Also for the file naming rule and the folder naming rule, it is possible to search for destination information using a telephone number of the transmission source of a received fax, and to obtain and use a registration name corresponding to the destination information. Also, in the file naming rule, it is possible to set a separator as a separation of the items. Furthermore, with the file naming rule, it is possible for the file name to be unique and in a form that the user can recognize. With this, it is possible to increase file name setting flexibility and to improve work efficiency for the user.

Also, because it is possible to generate a desired folder on the file server on which the image file is saved, there is the effect that the effort of the user searching for a desired image file can be reduced.

Second Embodiment

While in the previously described first embodiment configuration was taken so that a unique file name can be generated by the display processing of the file name pull-down menu shown in FIG. 18, here an example that performs control different to the previously described first embodiment is explained. In the second embodiment, by automatically changing information set in a selection item other than a changed selection item so as to be unique information, being able to generate a unique file name is guaranteed without restricting a selectable file name as the processing of in FIG. 18. Note that because the MFP, the system configuration, or the like according to a second embodiment are the same as in the previously described first embodiment, explanation thereof is omitted.

FIGS. 19A and 19B depict views for illustrating examples of a file naming rule setting screen according to the second embodiment of the present invention.

FIG. 19A shows a file naming rule setting screen where the item 1001, for which unique information "reception date and time" is selected, is pressed, and a pull-down menu 1901 for the item 1001 is displayed. The second embodiment is different to the first embodiment, and even in a state in which a unique value is not selected via another selection item (here the selection items 1002 and 1003), as shown in the pull-down menu 1901, because all options are displayed, it is possible to select any of them.

FIG. 19B shows a file naming rule setting screen for when the item 1001 of FIG. 19A is changed from "reception date and time", which is unique information, to "address book name", which is not unique. Here, the item 1001 is changed to "address book name", which the user selected from the pull-down menu 1901. Simultaneously, the information set in the item 1002 is automatically changed from the non-unique "fax number" of FIG. 19A to "reception date and time", which is unique.

In this way, in the second embodiment configuration is taken such that, when a selection item is changed and unique information is no longer present in any of the selection items that configure the file name, a file name that is always unique is generated by forcibly changing one of the other selection items to information that is unique. When information of the selection item 1002 is changed to unique information, a reason therefor is displayed in a status bar 1902.

Figure 20:
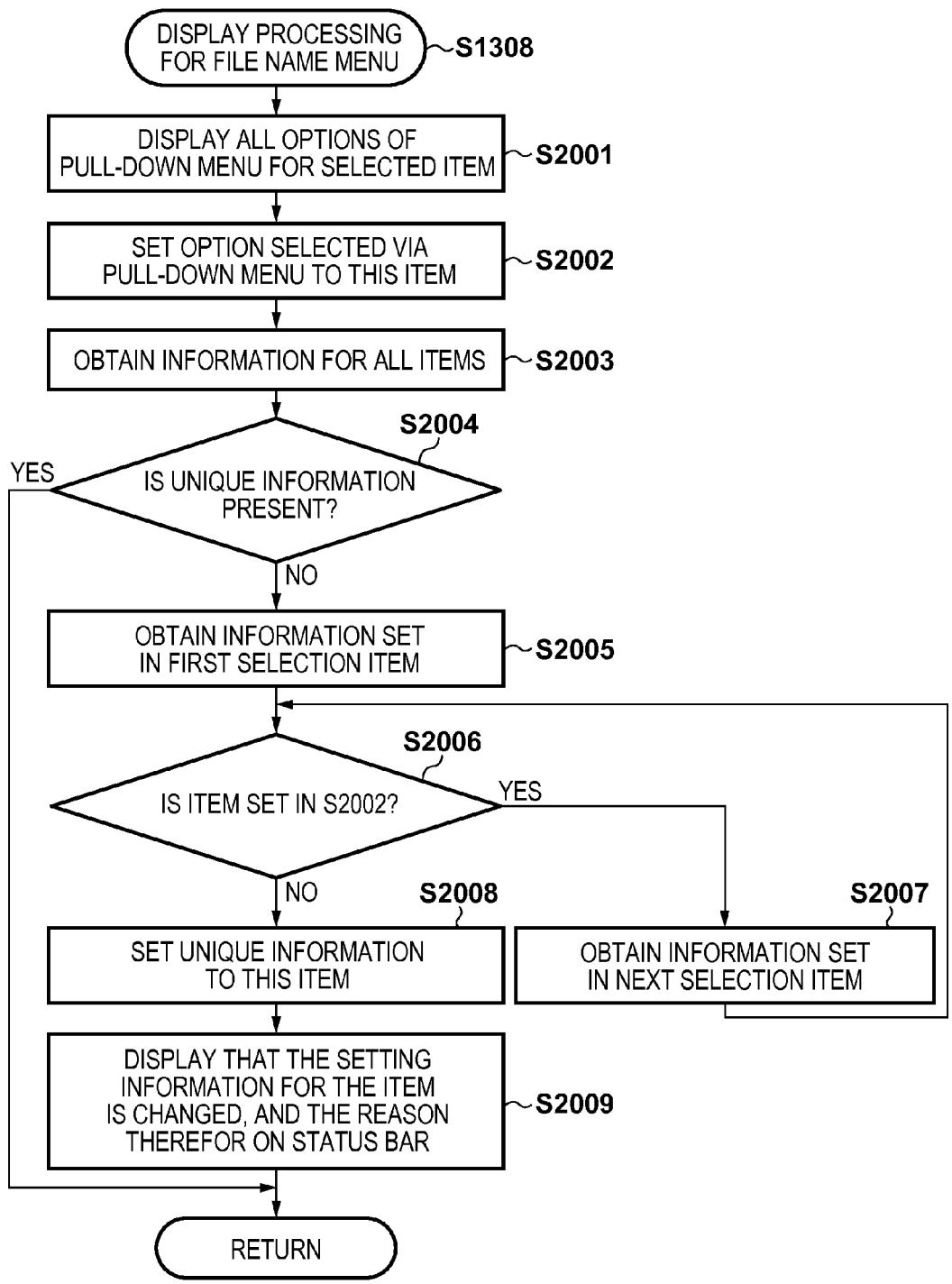
FIG. 20 is a flowchart for describing display processing of a file name pull-down menu in a file naming rule setting screen according to the second embodiment.

FIG. 20 is a flowchart for describing display processing of a file name pull-down menu in a file naming rule setting screen according to the second embodiment. Note that this processing is executed in step S1308 of FIG. 13. Note that the operations shown in this flowchart are realized by the CPU 201 of the MFP 110 deploying a control program stored in the HDD 204 into the RAM 203 and executing the control program, and the performer of these operations is explained as the CPU 201.

Firstly in step S2001 the CPU 201 displays the pull-down menu of the selected item. Here, all options that can be selected via the menu of the pull-down menu are for example displayed as in the pull-down menu 1901 of FIG. 19A. Next the processing proceeds to step S2002 and the CPU 201 sets information selected via the pull-down menu to the selected target item to be changed. Next, the processing proceeds to step S2003 and the CPU 201 obtains information set in all the selection items 1001-1003. The processing proceeds to step S2004 and the CPU 201 determines whether or not the information set in all of the selection items 1001-1003 includes unique information. When it is determined that unique information is included, processing terminates as is.

However, in step S2004 if the CPU 201 determines that unique information is not included, the processing advances to step S2005. In step S2005, the CPU 201 first obtains information set in selection item 1001, the first selection item of the file naming rule setting screen. Next, the processing proceeds to step S2006 and the CPU 201 determines whether the selection item, for which information was obtained in step S2005, is the same as the item selected in step S2002. If it is determined that they are the same, the processing proceeds to step S2007, information set in selection item 1002, which is next, is obtained and the processing proceeds to step S2006. Next, in step S2006, the CPU 201 determines whether the selection item, for which information was obtained in step S2007, is the same as the item selected in step S2002. Because the changed target item which is changed in step S2002 is the item that the user desires to change, this is to configure so as the item is not changed further.

In step S2006, if it is determined not to be the same as the item selected in step S2002, the processing proceeds to step S2008. In step S2008 the CPU 201 sets information that guarantees that the file name is unique to the selection item referenced in step S2006, and the processing proceeds to step S2009. Thereby, for example as shown in the previously explained FIG. 19B, a unique reception date and time is set to the selection item 1002. The processing proceeds to step S2009, the CPU 201 displays information that the selection item (the item 1002 in the example of FIG. 19B here) has been changed and a reason therefor on the status bar 1902, for example as shown in FIG. 19B, and this processing terminates.

By the second embodiment, as explained above, in a file naming rule setting screen, when it is predicted that a unique file name cannot be generated due to information of a selected change target item becoming information that is not unique, information of another selection item is forcibly changed to be unique information. Thereby, via this setting screen, a file name that is always unique can be generated.

Thus, it is possible to execute file name generation processing by displaying options of the pull-down menu of the change target item that the user selected and letting the user select an option, without restricting the options. Thus, it is possible for the user to always include information that the user desires in the file name, and it is possible to improve convenience for the user.

Third Embodiment

In the previously described first embodiment, a reliably unique file name could be generated by only displaying options that guaranteed a unique file name on the file name pull-down menu in the process as shown in FIG. 18. However, for example when there is only one piece of information that guarantees a unique file name, in the first embodiment, there is only one option displayed in the pull-down menu 1009 of FIG. 10B. Having only one option means the same thing as not being able to change to another item. Therefore, explanation is given of an example in which, by notifying the user so that it can be understood that change of the details of the selection item is prohibited, convenience of the user is improved. Note that because the MFP, the system configuration, or the like according to the third embodiment are the same as in the previously described first embodiment, explanation thereof is omitted.

FIG. 21 depicts a view for illustrating an example of a file naming rule setting screen according to the third embodiment of the present invention. Note that, a selectable item name in the third embodiment is configured as the registration name, the transmission source number, the reception date and time, the address book name, and the line name; the only information guaranteed to be unique is "reception date and time".

FIG. 21 shows a state in which the selection item 1001, which is the first selection item, is prohibited from being changed. This is because information of the selection items 1002 and 1003 is not unique, and furthermore because the information that can be set in the selection item 1001 is the only information guaranteed to be unique. In the third embodiment, in order to guarantee a unique file name, restriction processing such as follows is performed. In addition, a status bar 2101 displays a reason for why information set in the selection item 1001 cannot be changed.

Figure 22:
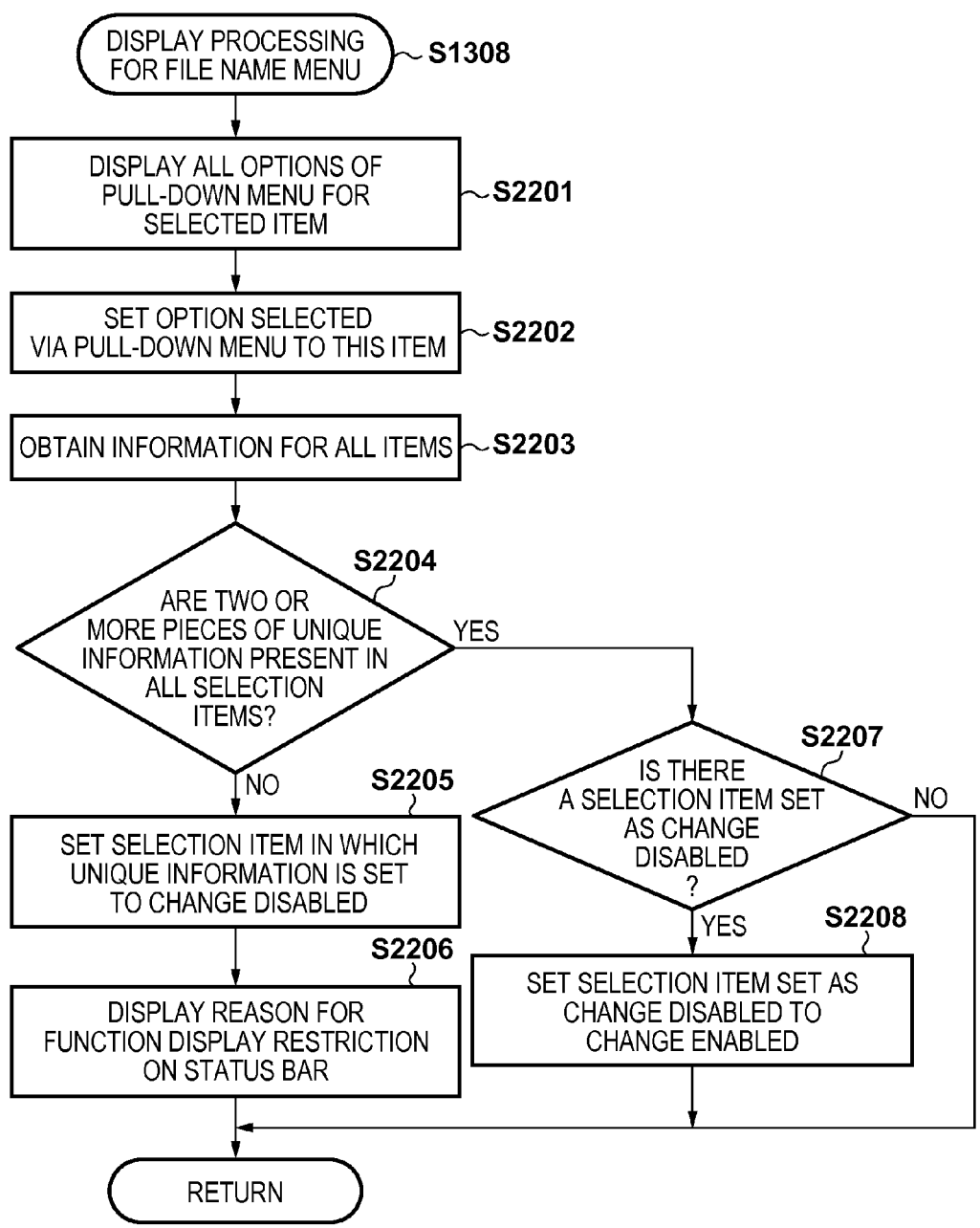
FIG. 22 is a flowchart for describing display processing of a file name pull-down menu in a file naming rule setting screen according to the third embodiment.

FIG. 22 is a flowchart for describing display processing of a pull-down menu of a file name in a file naming rule setting screen according to the third embodiment. Note that this processing is executed in step S1308 of FIG. 13. Note that the operations shown in this flowchart are realized by the CPU 201 of the MFP 110 deploying a control program stored in the HDD 204 into the RAM 203 and executing the control program, and the performer of these operations is explained as the CPU 201.

Firstly in step S2201, the CPU 201 displays the pull-down menu of the selected item. Here, all options that can be selected via the menu of the pull-down menu are for example displayed as in the pull-down menu 1901 of FIG. 19A. Next the processing proceeds to step S2202 and the CPU 201 sets information selected via the pull-down menu 1901 to the selected item. Next, the processing proceeds to step S2203 and the CPU 201 obtains information set in all the selection items 1001-1003. The processing proceeds to step S2204 and the CPU 201 determines whether or not the information set in all of the selection items 1001-1003 includes two or more pieces of unique information. If it is determined to include two or more pieces of unique information, the processing proceeds to step S2207, the CPU 201 refers to the information set in the selection items 1001-1003 that was obtained in step S2203, and determines whether or not there is a selection item set to change disabled. If there is a selection item set as change disabled, the processing proceeds to step S2208, the CPU 201 sets the selection item set as change disabled to being change enabled, and the processing terminates. In addition, in step S2207 if it is determined that there is no selection item set as change disabled, the processing terminates.

In step S2204, if the CPU 201 determines that two or more pieces of unique information are not included, the processing proceeds to step S2205. Under the assumption that one of the selection items that configure the file name includes unique information, step S2205 is implemented when there is only one selection item in which unique information is set. Accordingly, in step S2205, the CPU 201 sets the selection item in which the unique information is set to being change disabled, for example, as shown in the item 1001 of FIG. 21. The processing proceeds to step S2206, the CPU 201 displays to the effect that the selection item cannot be changed (a reason for a functional restriction), as shown in the status bar 2101 of FIG. 21, and the processing terminates.

As explained above, by virtue of the third embodiment, in addition to the effect of the first embodiment, because the user can recognize a selection item for which information that is set cannot be changed, or a reason therefor is clearly described, it is possible to improve convenience for the user.

Fourth Embodiment

In the previously explained second embodiment, in the display processing shown in FIG. 20, when a selection item that guarantees a unique file name is not present, it is configured so that a reliably unique file name can be generated by changing information of another selection item to be unique information. However, if the user does not realize that the information set in the other selection item has been changed, it can be considered that due to the automatic change to the information of the selection item, a file name that the user did not intend will be generated. Therefore, explanation is given of an example in which, by making a request to the user for permission/prohibition as to whether to change information of another selection item, convenience of the user is improved. Note that because the MFP, the system configuration, or the like according to the fourth embodiment are the same as in the previously described first embodiment, explanation thereof is omitted.

FIG. 23 depicts a view for illustrating an example of a file naming rule setting screen according to the fourth embodiment of the present invention.

In FIG. 23, if a unique file name cannot be generated due to an operation of a selection item by the user, a dialog 2301 that confirms permission/prohibition as to whether to change a value of another selection item to be unique information is displayed to the user. Here, information of the selection item 1001 has been changed from the unique "reception date and time" to the non-unique "address book name". The dialog 2301 for confirmation requests the user for permission to change information of the selection item 1002 from the non-unique "fax number" to the unique "reception date and time". Here, if the user presses a "YES" button 2302, it is determined that the user has permitted the change of the information of the selection item 1002, and the information of the selection item 1002 is changed to "reception date and time". Here, if a "NO" button 2303 is pressed, it is determined that the user has not permitted the change of the information of the selection item 1002, and the information of the selection item 1002 is not changed. At this point, to maintain generation of a unique file name, the information of the selection item 1001 is returned to "reception date and time", which is the unique value before the change. Alternatively, configuration may also be taken such that permission to change information of the selection item 1003 from the non-unique "registration name" to the unique "reception date and time" is requested from the user.

Figure 24:
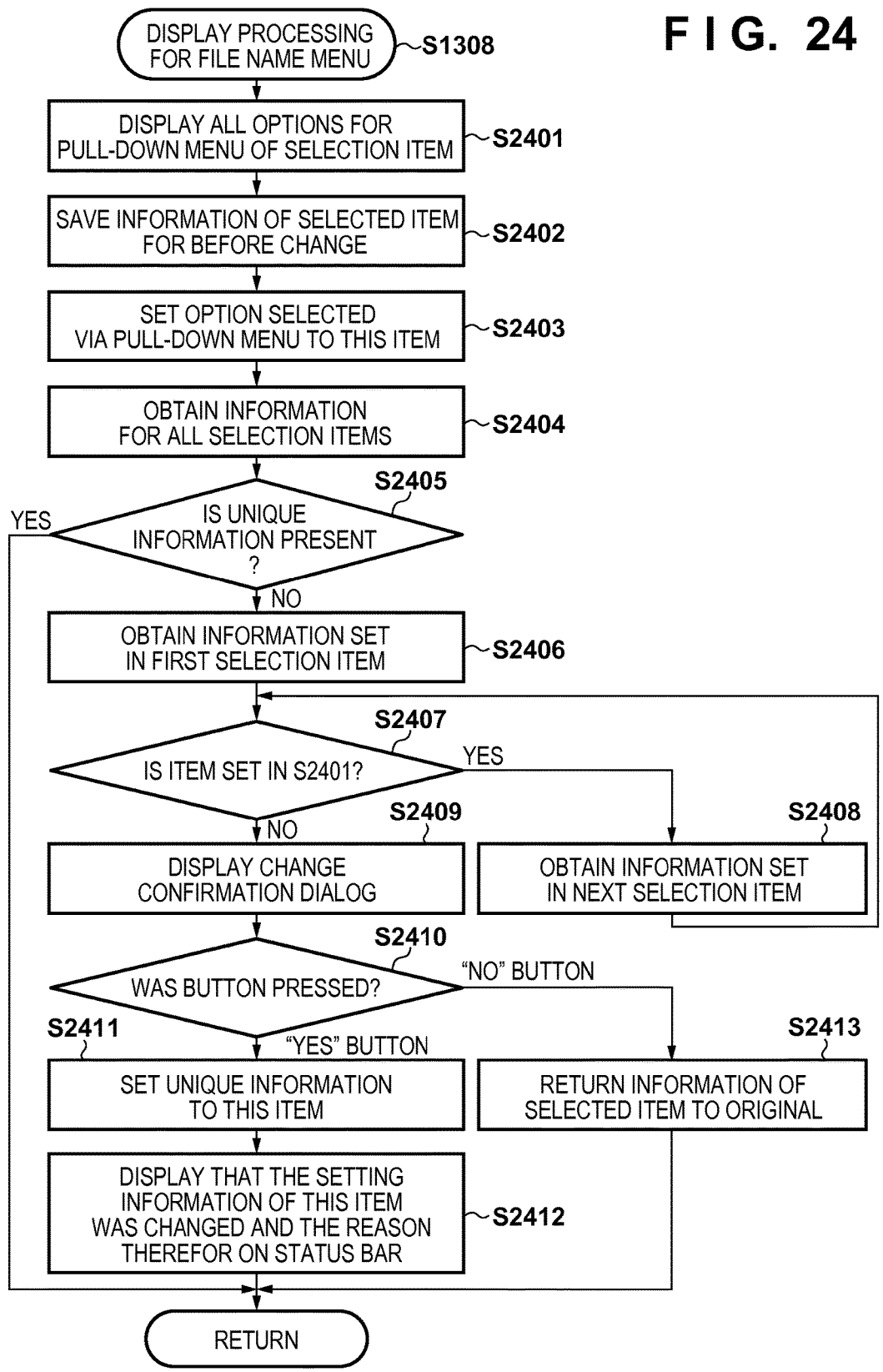
FIG. 24 is a flowchart for describing display processing of a file name pull-down menu in a file naming rule setting screen according to the fourth embodiment.

FIG. 24 is a flowchart for describing display processing of a pull-down menu of a file name in a file naming rule setting screen according to the fourth embodiment. Note that the processing is executed in step S1308 of FIG. 13. Note that the operations shown in this flowchart are realized by the CPU 201 of the MFP 110 deploying a control program stored in the HDD 204 into the RAM 203 and executing the control program, and the performer of these operations is explained as the CPU 201.

Firstly in step S2401 the CPU 201 displays the pull-down menu of the selected item. Here, all options that can be selected via the menu of the pull-down menu are for example displayed as in the pull-down menu 1901 of FIG. 19A. Next, the processing proceeds to step S2402, and the CPU 201 holds information set in the selection item that the user selected in a memory such as the RAM 203 as information before the change. Next the processing proceeds to step S2403 and the CPU 201 sets information selected via the pull-down menu to the change target item. Next, the processing proceeds to step S2404 and the CPU 201 obtains information set in all the selection items 1001-1003. The processing proceeds to step S2405 and the CPU 201 determines whether or not the information set in all of the selection items 1001-1003 includes unique information. When it is determined that unique information is included, processing terminates as is.

However, in step S2405 if the CPU 201 determines that unique information is not included, the processing advances to step S2406. In step S2406 the CPU 201 first obtains information set in selection item 1001, the first selection item of the file naming rule setting screen. Next, the processing proceeds to step S2407 and the CPU 201 determines whether or not the selection item, for which information was obtained in step S2405, is the same as the item selected in step S2401. If it is determined that they are the same, the processing proceeds to step S2408, information set in selection item 1002, which is next, is obtained and the processing proceeds to step S2407. In step S2407, the CPU 201 determines whether or not the selection item, for which information was obtained in step S2408, is the same as the item selected in step S2401. If it is determined that they are the same, the processing proceeds to step S2408, otherwise the process proceeds to step S2409. This is the same as the processing of step S2005 to step S2007 of FIG. 20.

In step S2407 if it is determined not to be the same as the item selected in step S2401, the processing proceeds to step S2409. In step S2409, the CPU 201, for example, displays a confirmation dialog 2301 such as shown in FIG. 23, making a request to the user for permission to change the information set in the selection item 1002.

Next, the processing proceeds to step S2410, and the CPU 201 determines whether or not the user has pressed the "YES" button 2302 or the "NO" button 2303 in the screen of FIG. 23. If it is determined that the "YES" button 2302 has been pressed the processing proceeds to step S2411, and if it is determined that the "NO" button 2303 has been pressed the processing proceeds to step S2413. In step S2411, the CPU 201 sets information that guarantees that the file name is unique to the selection item referenced in step S2407, and the processing proceeds to step S2412. Thereby, for example as shown in the previously explained FIG. 19B, a unique reception date and time is set to the selection item 1002. The CPU 201, for example as shown in FIG. 19B, displays in the status bar 1902 that the information of the selection item has been changed and a reason therefor, and the processing terminates.

If it is determined in step S2410 that the "NO" button 2303 has been pressed, the processing proceeds to step S2413, the information of the selection item selected in step S2401 is returned to the original information saved in the memory in step S2402, and the processing terminates.

As explained above, according to the fourth embodiment, in addition to the previously described effect of the second embodiment, by requesting the user for permission to change information set in the selection item, the user can confirm that information set in the selection item has been changed. Thereby the user can prevent the occurrence of a situation in which information set in a selection item is automatically changed and the user does not realize.

Further Embodiments

In above-mentioned embodiments, it is possible to designate the registration name, the telephone number, and the reception date and time as the configuration of the folder name, but in a case such as where two fax lines are connected to the modem 210 of the MFP 110, configuration may be taken so that the line number thereof can be designated as the folder name.

In the previously described embodiments, a plurality of screens are displayed and setting are performed using the plurality of screens in a wizard format, but configuration may be taken so that all settings are possible in one screen.

In the previously described embodiments, a user operates the console unit 111 of the MFP 110 to display the setting screen of the console unit 111, and then the user performed setting via this screen, but configuration may be taken so that the setting screen can be operated from a Web browser of a general-purpose personal computer.

Other Embodiments

The embodiment of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of the above-described embodiment and/or that includes one or more circuits (e.g., application specific integrated circuit (ASIC)) for performing the functions of the above-described embodiment, and by a method performed by the computer of the system or apparatus by, for example, reading out and executing the computer executable instructions from the storage medium to perform the functions of the above-described embodiment and/or controlling the one or more circuits to perform the functions of the above-described embodiment. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-225440, filed Nov. 5, 2014, which is hereby incorporated by reference herein in its entirety.

What is claimed is:

1. An information processing apparatus, comprising:
a memory configured to store instructions; and
a processor configured to execute the instructions to:
    display a setting screen for setting a naming rule, wherein the displayed setting screen receives setting of information for each item of a plurality of items to be used as the naming rule for generating a file name;
    determine, when a user selects a target item from the plurality of items in the setting screen for changing information being set for the target item, whether the plurality of items other than the target item includes an item for which information that defines the file name to be unique has been set;
    restrict, in the displayed setting screen, information that can be changed for the target item to the information that defines the file name to be unique, where it is determined that none of the plurality of items other than the target item includes an item for which the information that defines the file name to be unique has been set, wherein the information that can be changed for the target item is not restricted to the information that defines the file name to be unique, where it is determined that the plurality of items other than the target item includes an item for which the information that defines the file name to be unique has been set;
    store, as the naming rule, information being set for the plurality of items in the setting screen after the information being set for the target item has been changed; and
    generate a file name based on the stored naming rule.

2. The information processing apparatus according to claim 1, wherein the setting screen displays a list of information that can be set for each item of the plurality of items, and information selected by a user from the list is set for the target item.

3. The information processing apparatus according to claim 2, wherein, where it is determined that none of the plurality of items other than the target item includes the item for which the information that defines the file name to be unique has been set when changing the information set for the target item, the list displayed in the setting screen is restricted to the information that defines the file name to be unique.

4. The information processing apparatus according to claim 1, wherein, where it is determined that none of the plurality of items other than the target item includes an item for which the information that defines the file name to be unique has been set, the setting screen further displays information indicating that the information to be set for the target item is being restricted.

5. The information processing apparatus according to claim 1, wherein the information that defines the file name to be unique includes at least one of a reception date and time, and a serial number of the information processing apparatus.

6. A method of controlling an information processing apparatus, the method comprising:
    displaying a setting screen for setting a naming rule, wherein the displayed setting screen receives setting of information for each item of a plurality of items to be used as the naming rule for generating a file name;
    determining, when a user selects a target item from the plurality of items in the setting screen for changing information being set for the target item, whether the plurality of items other than the target item includes an item for which information that defines the file name to be unique has been set;
    restricting, in the displayed setting screen, information that can be changed for the target item to the information that defines the file name to be unique, where it is determined that none of the plurality of items other than the target item includes an item for which the information that defines the file name to be unique has been set, wherein the information that can be changed for the target item is not restricted to the information that defines the file name to be unique, where it is determined that the plurality of items other than the target item includes an item for which the information that defines the file name to be unique has been set;
    storing, as the naming rule, information being set for the plurality of items in the setting screen after the information being set for the target item has been changed; and
    generating a file name based on the stored naming rule.

7. A non-transitory computer-readable storage medium storing a program for causing a computer to perform:
    displaying a setting screen for setting a naming rule, wherein the displayed setting screen receives setting of information for each item of a plurality of items to be used as the naming rule for generating a file name;
    determining, when a user selects a target item from the plurality of items in the setting screen for changing information being set for the target item, whether the plurality of items other than the target item includes an item for which information that defines the file name to be unique has been set;
    restricting, in the displayed setting screen, information that can be changed for the target item to the information that defines the file name to be unique, where it is determined that none of the plurality of items other than the target item includes an item for which the information that defines the file name to be unique has been set, wherein the information that can be changed for the target item is not restricted to the information that defines the file name to be unique, where it is determined that the plurality of items other than the target item includes an item for which the information that defines the file name to be unique has been set;

storing, as the naming rule, information being set for the plurality of items in the setting screen after the information being set for the target item has been changed; and generating a file name based on the stored naming rule.

* * * * *